US007401126B2

(12) United States Patent
Pekkala et al.

(10) Patent No.: US 7,401,126 B2
(45) Date of Patent: Jul. 15, 2008

(54) TRANSACTION SWITCH AND NETWORK INTERFACE ADAPTER INCORPORATING SAME

(75) Inventors: Richard E. Pekkala, Austin, TX (US); Christopher J. Pettey, Cedar Park, TX (US); Lawrence H. Rubin, Austin, TX (US); Shaun V. Wandler, Austin, TX (US)

(73) Assignee: NetEffect, Inc., Austin, TX (US)

( * ) Notice: Subject to any disclaimer, the term of this patent is extended or adjusted under 35 U.S.C. 154(b) by 776 days.

(21) Appl. No.: 09/817,008

(22) Filed: Mar. 23, 2001

(65) Prior Publication Data
US 2002/0172195 A1    Nov. 21, 2002

(51) Int. Cl.
G06F 15/16    (2006.01)
(52) U.S. Cl. .................... 709/217; 710/58; 710/62; 710/104; 710/107; 710/112; 710/305
(58) Field of Classification Search ................. 710/105; 370/401
See application file for complete search history.

(56) References Cited

U.S. PATENT DOCUMENTS

| 5,434,976 | A | * | 7/1995 | Tan et al. .................... 709/234 |
| 5,758,075 | A | * | 5/1998 | Graziano et al. ............ 709/250 |
| 5,832,216 | A | * | 11/1998 | Szczepanek ................. 709/250 |
| 5,953,511 | A | * | 9/1999 | Sescila et al. ............... 710/315 |
| 6,052,751 | A | * | 4/2000 | Runaldue et al. ............ 710/107 |
| 6,067,300 | A | * | 5/2000 | Baumert et al. ............. 370/413 |
| 6,145,045 | A | * | 11/2000 | Falik et al. .................. 710/310 |
| 6,199,137 | B1 | | 3/2001 | Aguilar et al. |
| 6,400,730 | B1 | | 6/2002 | Latif et al. |
| 6,408,347 | B1 | * | 6/2002 | Smith et al. .................. 710/36 |
| 6,418,201 | B1 | | 7/2002 | Holland et al. |
| 6,502,156 | B1 | | 12/2002 | Sacker et al. |
| 6,535,518 | B1 | * | 3/2003 | Hu et al. ..................... 370/401 |
| 6,594,329 | B1 | | 7/2003 | Susnow |
| 6,594,712 | B1 | * | 7/2003 | Pettey et al. ................. 710/22 |
| 6,601,126 | B1 | * | 7/2003 | Zaidi et al. .................. 710/305 |
| 6,625,157 | B2 | * | 9/2003 | Niu et al. ................. 370/395.71 |

(Continued)

OTHER PUBLICATIONS

"The Role of Microelectronics in Communication", Jonh S. Mayo, Scientific American, vol. 277, 1977.*

(Continued)

Primary Examiner—Bunjob Jaroenchonwanit
Assistant Examiner—Duyen M Doan
(74) Attorney, Agent, or Firm—E. Alan Davis; James W. Huffman

(57) ABSTRACT

A transaction switch and integrated circuit incorporating said for switching data through a shared memory between a plurality of data interfaces that support different data protocols, namely packetized interfaces like InfiniBand and addressed data interfaces like PCI. The transaction switch also switches transactions commanding data transfers between the disparate protocol data interfaces and between those of the data interfaces having like protocols. For example, the transaction switch enables a hybrid InfiniBand channel adapter/switch to perform both InfiniBand packet to local bus protocol data transfers through the shared memory as well as InfiniBand packet switching between the multiple InfiniBand interfaces. The transactions are tailored for each interface type to include information needed by the particular interface type to perform a data transfer. The shared buffer memory, dynamically allocated by the transaction switch on a first-come-first serve basis, results in more efficient use of precious buffering resources than in a statically allocated scheme.

80 Claims, 18 Drawing Sheets

U.S. PATENT DOCUMENTS

| | | | |
|---|---|---|---|
| 6,658,521 B1 * | 12/2003 | Biran et al. | 710/315 |
| 6,661,773 B1 | 12/2003 | Pelissier et al. | |
| 6,694,394 B1 * | 2/2004 | Bachrach | 710/100 |
| 6,704,831 B1 * | 3/2004 | Avery | 710/310 |
| 6,760,307 B2 | 7/2004 | Dunning et al. | |
| 6,763,419 B2 | 7/2004 | Hoese et al. | |
| 6,778,548 B1 * | 8/2004 | Burton et al. | 370/429 |
| 7,093,024 B2 * | 8/2006 | Craddock et al. | 709/238 |
| 2001/0049740 A1 * | 12/2001 | Karpoff | 709/231 |
| 2002/0073257 A1 * | 6/2002 | Beukema et al. | 710/105 |
| 2004/0015622 A1 * | 1/2004 | Avery | 710/22 |
| 2004/0221276 A1 * | 11/2004 | Raj | 717/136 |

OTHER PUBLICATIONS

"Building Up Chips Using VHDL and Synthesis", Doug Warmke, System Design Dec. 1994/Jan. 1995.*

* cited by examiner

IB Hybrid Channel Adapter/Switch

IB Hybrid CA/Switch with Transaction Switch and Shared Buffer Memory

Transaction Switch Data Paths

Transaction Queues

| DLID | Frame Error | LNH | Destination QP | Packet Length | VL | Buffer Address |
|------|-------------|-----|----------------|---------------|-----|----------------|
| 602  | 604         | 606 | 608            | 612           | 614 | 616            |

MAC Input Queue Entry   ↖ 600

| Tag | PCI Address/Port | Length | Offset | VL | Type | Buffer Address |
|-----|------------------|--------|--------|-----|------|----------------|
| 702 | 704              | 706    | 708    | 712 | 714  | 716            |

Bus Router Input Queue Entry   ↖ 700

FIG. 8

| Not Raw 802 | Tag 804 | Packet Length 806 | VL 808 | Buffer Address 812 |
|---|---|---|---|---|

MAC Output Queue Entry  ↖ 800

FIG. 9

| Port 902 | Frame Error 904 | LNH 906 | Destination QP 908 | Length 912 | VL 914 | Buffer Address 916 |
|---|---|---|---|---|---|---|

Bus Router Output Queue Entry  ↖ 900

FIG. 10

| Tag 1002 | PCI Address 1004 | Length 1006 | Offset 1008 | PCI Type 1012 | Buffer Address 1014 |
|---|---|---|---|---|---|

PCI Output Queue Entry  ↖ 1000

| | Bus Router 1102 | Port 1104 | DLID 1106 | Valid 1108 |
|---|---|---|---|---|
| 0 | 1 | 0 | 0x0005 | 1 |
| 1 | 1 | 1 | 0x0006 | 1 |
| 2 | 1 | 2 | 0x0007 | 1 |
| 3 | 1 | 3 | 0x0008 | 1 |
| 4 | 0 | 1 | 0x0001 | 1 |
| 5 | 0 | 1 | 0x0002 | 1 |
| 6 | 0 | 1 | 0x0003 | 1 |
| 7 | 0 | 1 | 0x0004 | 1 |
| 8 | 0 | 0 | 0x0009 | 1 |
| 9 | 0 | 2 | 0x000A | 1 |
| 10 | 0 | 3 | 0x000B | 1 |
| 11 | 0 | 2 | - | 0 |
| 12 | 0 | 1 | - | 0 |
| 13 | 0 | 3 | - | 0 |
| 14 | 0 | 2 | - | 0 |
| 15 | 0 | 2 | 0x0007 | 1 |

412

Port Switch Mapping Table in Example Network

FIG. 12
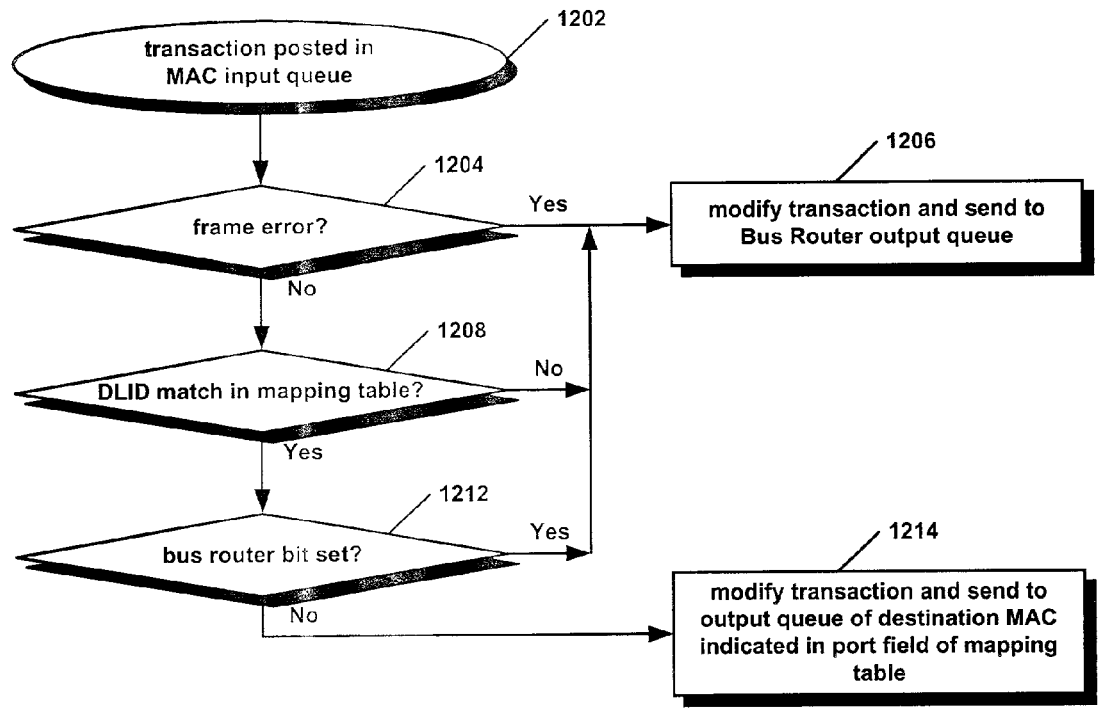
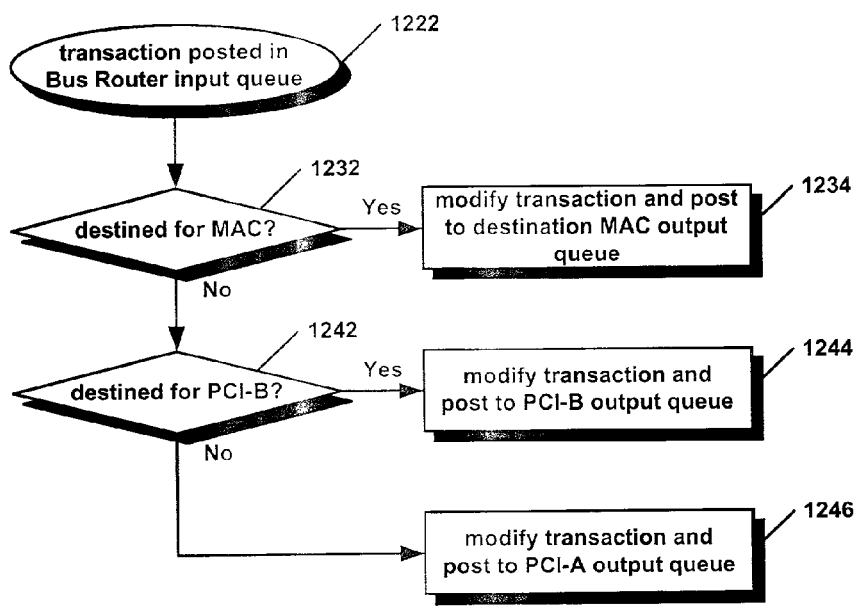
Transaction Switching

Packet Switching Operation

FIG. 13b
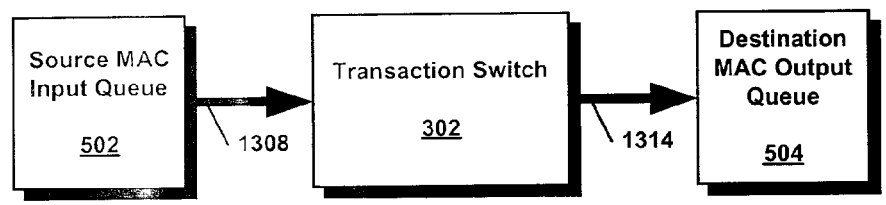
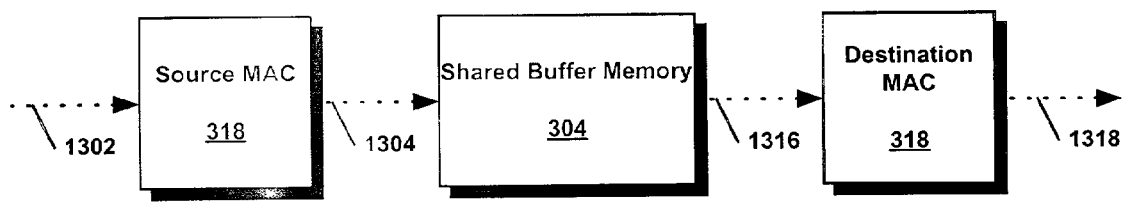
Packet Switching Operation

Packetized Data to Addressed Data Operation

Packetized Data to Addressed Data Operation

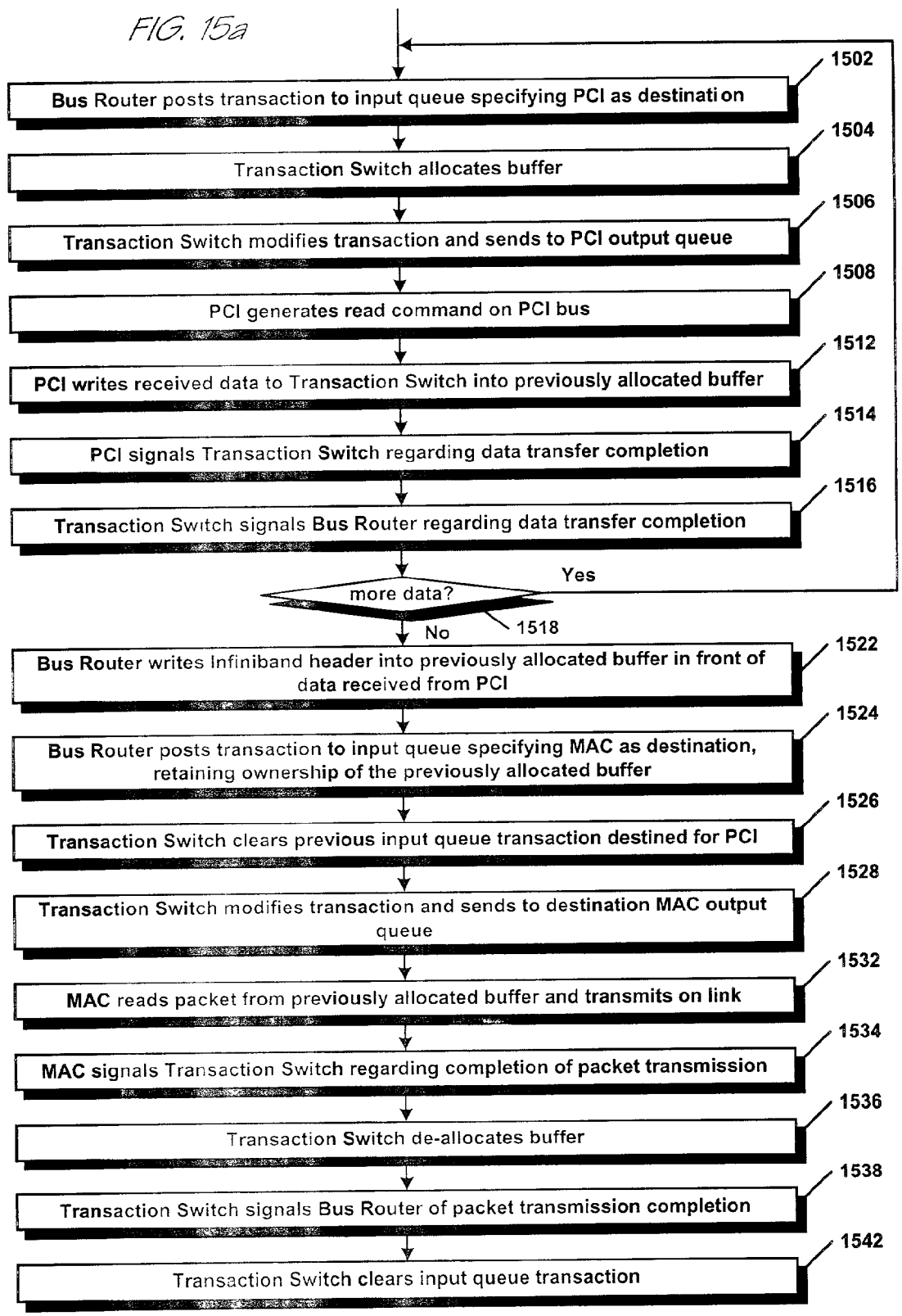
Addressed Data to Packetized Data Operation

Addressed Data to Packetized Data Operation

IB Hybrid CA/Switch with Transaction Switch and Shared Buffer Memory

| PCI Address 1702 | Length 1704 | Buffer Address 1706 | PCI Cycle Type 1708 |

PCI Input Queue Entry

Addressed Data Switching Operation

FIG. 18b
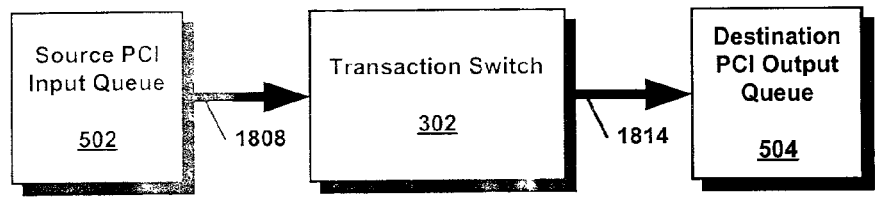
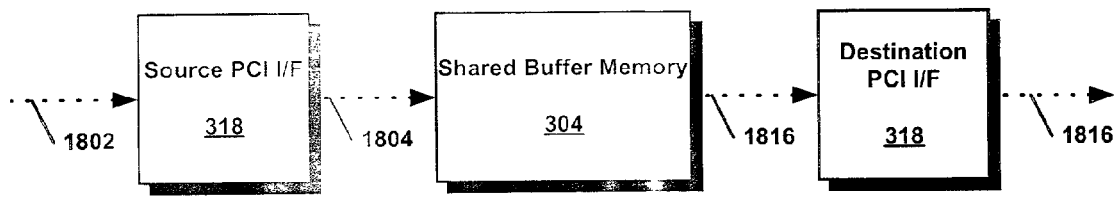
Addressed Data Switching Operation

TRANSACTION SWITCH AND NETWORK INTERFACE ADAPTER INCORPORATING SAME

BACKGROUND OF THE INVENTION

1. Field of the Invention

This invention relates in general to data buffering, switching and routing in computer networks, and in particular to buffering, switching and routing data between devices or interfaces having disparate data protocols and data formats.

2. Description of the Related Art

Computer networks consist of various elements that process data, store data, or transfer data between the elements. Typically, each of the network elements manages the data in disparate forms. For example, an operating system running on a processor element typically deals with data based upon the address of the data stored in a local memory. The data is transferred between the processor and memory on a processor or memory bus using one type of data transfer protocol. Similarly, data may be transferred between the processor or the memory and an I/O device in a system on an I/O bus, such as a PCI bus, using a different data protocol. Still further, data may be transferred in packets between two different computers on a network cable, such as an Ethernet cable, using a third protocol.

It is necessary for elements within a network desiring to transfer data between one another to convert or translate from one data protocol to another when moving the data between the elements. Consider, for example, a network interface card (NIC) that transfers data between an Ethernet cable and a PCI local I/O bus. The NIC includes an Ethernet interface, which is an example of a packetized data interface, for receiving a packet of data one bit at a time according to the Ethernet serial cable protocol. The NIC also includes a PCI interface, which is an example of an addressed data interface, for transferring the data packet to system memory according to the PCI bus protocol. Conversely, the NIC is capable of receiving a packet of data from system memory on the PCI bus and transmitting the data on the Ethernet cable.

For at least two reasons, the NIC may also be required to buffer the data in a memory on the NIC in between receiving the data from one interface and transmitting the data on the other interface. First, the PCI bus protocol and Ethernet protocol have different data transfer rates. In particular, the PCI bus is capable of transferring data at a much faster rate than the Ethernet protocol. Hence, if the NIC does not buffer the data from the PCI interface, some of the data may be lost before it can be transmitted on the Ethernet interface.

Second, the two protocols have different arbitration techniques. In the PCI protocol, a device desiring to transfer data must first arbitrate for and be granted ownership of the bus at which time it may transfer up to a maximum amount of data before relinquishing ownership of the bus. In contrast, Ethernet devices may transmit at will; however, they are subject to collision back off and retry algorithms. Hence, if the NIC does not buffer the data from the Ethernet interface, some of the data may be lost before the PCI interface can arbitrate for and be awarded ownership of the PCI bus, or vice versa if a collision occurs and the time to successfully retry is relatively lengthy.

Recently, a new packetized data transfer protocol, the InfiniBand™ Architecture (IBA), has been defined for performing data transfers between computers and their peripheral devices, such as storage devices and network interface devices, and between computers themselves. The IBA is a high speed, highly reliable, serial computer interconnect technology. The IBA specifies interconnection speeds of 2.5 Gbps (Gigabits per second) (1× mode), 10 Gbps (4× mode) and 30 Gbps (12× mode) between IB-capable computers and I/O units.

The IBA specifies InfiniBand (IB) channel adapters (CA) for adapting an InfiniBand packetized data link to another data transfer protocol, such as an addressed data bus like the PCI bus. Channel adapters enable a host computer or I/O device to connect to an IBA network by performing protocol translation between the IBA protocol and the local bus protocol, such as PCI. For example, in response to programming from a local processor, the CA may transfer a payload of data from a memory on the local bus, create an IB packet with the data, and transmit the packet to another IB node. Conversely, the CA may receive an IB packet, extract the payload of data from it, determine where in the memory the payload belongs, and transfer the payload data on the local bus to the memory. This is a protocol translation function, commonly referred to as a transport layer function, performed by the CA in addition to the protocol translation performed by the NIC described above, which simply transfers the entire packet from one interface to another, from the addressed data interface to the packetized interface and vice versa. In the case of the NIC, the local processor performs the transport layer function.

In addition to channel adapters, the IBA also specifies IB switches, for switching IBA packets within a local subnet of IBA channel adapters. IB switches include multiple IB ports for connecting to multiple IB channel adapters on IB links. Each channel adapter port has a unique local subnet identification number. The IB switches maintain switching tables that enable the switches to receive a packet in one port and switch the packet out another port that is connected to the destination channel adapter or to another switch from which the destination channel adapter is downstream.

It is desirable to include the functionality of an IB channel adapter and switch together in a single device, which may be referred to as a hybrid channel adapter/switch. A hybrid channel adapter/switch would be required to perform two functions. First, it would have to perform protocol translation between an IB link and a local bus, such as PCI. Second, it would have to perform IB packet switching between the various IB ports.

It is also highly desirable for the hybrid channel adapter/switch to perform a third function: addressed data switching or bridging. This function derives from the fact that it is desirable to have multiple addressed data local bus interfaces or ports, such as multiple PCI bus interfaces.

Multiple local bus ports are necessary to supply sufficient data throughput to match the IB port bandwidth, due to the enormous data throughput IB links are capable of sustaining. Furthermore, local bus loading specifications, such as PCI, limit the number of I/O controllers that may be attached to a local bus. Hence, it is also desirable to have multiple local bus ports on the hybrid channel adapter/switch to enable more I/O controllers to be connected than a single local bus can support. In such an arrangement, the I/O controllers on disparate local buses need to be able to transfer addressed data to one another. Additionally, an I/O controller will need to transfer data to or from a system or local memory that is connected to a memory controller on a different local bus than the I/O controller. Hence, the hybrid channel adapter/switch must be capable of switching or bridging addressed data between its multiple local bus interfaces.

For similar reasons described above with respect to the NIC, the hybrid channel adapter/switch would also need to perform data buffering, not only for the protocol translation function, but also for the packet switching and addressed data bridging functions. One obvious solution is to extend the architecture of the NIC described above. That is, the hybrid channel adapter/switch could provide a dedicated buffer memory for each possible data transfer path between each of the interfaces in the hybrid channel adapter/switch. A buffer between each of the combinations of paths between the IB interfaces would provide packet buffering for the packet switching function. Similarly, buffers between the PCI interfaces would provide addressed data buffering for the local bus bridging function. Buffers between the protocol translation device and the IB and PCI interfaces would provide buffering for the protocol translation function.

However, there are drawbacks to the solution just described. First, the solution makes inefficient use of the buffering memories. Due to the high transfer rates of the interfaces in question, the size of the buffers on many of the paths may have to be relatively large in order to achieve optimum transfer rates in the worst-case conditions. Hence, the solution may require more total buffer memory than is realistically manufacturable given contemporary semiconductor manufacturing capabilities. Consequently, a decision must be made a priori concerning how the limited buffer memory space will be statically divided among the data paths between the various interfaces.

This static allocation may at times result in inefficient use of the buffering resources. For example, the flow of data traffic through the hybrid channel adapter/switch may be such that for some periods some of the data paths are not used and others are saturated. In this situation, the buffers in the idle data paths are sitting empty. In contrast, because the heavily used paths do not have sufficient buffering resources, the overall data throughput rate through the hybrid channel adapter/switch may be reduced. A more efficient solution would enable the unused buffers to be used to facilitate the flow of data through the paths needing additional buffering resources.

A second drawback is that the solution requires double-buffering in the case of the transport layer protocol translation function. For example, a packet is received by an IB interface and stored in a buffer on the data path between the IB interface and the transport layer device. The transport layer device then reads the packet from the buffer, performs the necessary translation function, and writes the translated data to a buffer on the data path between the transport layer device and the destination local bus interface. The local bus interface then reads the translated data from the second buffer and transfers the data on the local bus. This double-buffering, i.e., buffering the data twice within the hybrid channel adapter/switch, works to reduce the overall bandwidth of data that may be transferred through the hybrid channel adapter/switch.

Therefore, what is needed is an apparatus in a network adapter having multiple disparate data protocol interfaces or devices to transfer data both between interfaces of the same type and between interfaces of a different type. The apparatus needs to perform the transfers without double-buffering the data and in such a manner that makes efficient use of valuable, limited buffer memory resources.

SUMMARY

To address the above-detailed deficiencies, it is an object of the present invention to provide an apparatus, system and method that allows disparate data interfaces to share a single large memory and allocate buffers from the shared memory on an as-needed basis and that allows the interfaces to read and write the shared memory for switching data between interfaces of like protocol and for translating between interfaces of disparate protocols without double-buffering the data. Accordingly, in attainment of the aforementioned object, it is a feature of the present invention to provide an integrated circuit capable of functioning as an InfiniBand channel adapter and an InfiniBand switch. The integrated circuit includes a plurality of InfiniBand media access controllers (MACs) for transmitting and receiving InfiniBand packets, a plurality of local bus interfaces for performing addressed data transfers on a plurality of local buses coupled thereto, a bus router for performing transport layer operations between the plurality of InfiniBand MACs and the plurality of local bus interfaces, and a transaction switch. The transaction switch is coupled to each of the plurality of InfiniBand MACs, the plurality of local bus interfaces, and the bus router for switching data and transactions between them.

An advantage of the present invention is that it facilitates more efficient use of buffering resources since limited buffering resources do not have to be divided up among data paths statically. The more efficient use of the buffering resources potentially facilitates a more manufacturable integrated circuit with acceptable data throughput performance.

Another advantage of the present invention is that it does not require double buffering of the data in performing data protocol translation between the devices.

In another aspect, it is a feature of the present invention to provide a transaction switch for switching data between a plurality of data devices. The transaction switch includes a memory shared by the plurality of data devices for buffering data received by them, multiplexing logic for controlling the transfer of data between the plurality of data devices and the memory, and control logic for controlling the multiplexing logic. The plurality of data devices includes a plurality of packetized data devices and a plurality of addressed data devices. The control logic selectively controls the multiplexing logic to transfer data through the memory between two of the packetized data devices and between one of the packetized data devices and one of the addressed data devices.

In yet another aspect, it is a feature of the present invention to provide a transaction switch for switching transactions and data between a plurality of data interfaces. The transaction switch includes a memory shared by the plurality of data interfaces for buffering data received by them and a plurality of transaction queues associated with each of the plurality of data interfaces. The transaction queues store transactions adapted to convey information to enable the plurality of data interfaces to transfer the data according to a plurality of disparate data transfer protocols supported by them. The transaction switch also includes control logic that routes the data through the shared memory between the plurality of data interfaces and to switch the transactions between the plurality of data interfaces.

In yet another aspect, it is a feature of the present invention to provide an integrated circuit. The integrated circuit includes at least three data interfaces, a memory, shared by the three data interfaces for buffering data between them, and a transaction switch coupled to the least three data interfaces and the memory. The transaction switch dynamically allocates portions of the memory to the three data interfaces for storing data in them and controls access to the allocated portions of the memory by each of the three data interfaces. At least one of the at least three data interfaces is of a different type than the others.

In yet another aspect, it is a feature of the present invention to provide an integrated circuit. The integrated circuit includes a plurality of packetized data interfaces, a plurality of addressed data interfaces, and a transaction switch coupled to the plurality of packetized data interfaces and to the plurality of addressed data interfaces. The transaction switch switches a packetized data transaction from a first of the plurality of packetized data interfaces to a second of the plurality of packetized data interfaces and switches an addressed data transaction from a first of the addressed data interfaces to a second of the addressed data interfaces.

In yet another aspect, it is a feature of the present invention to provide an InfiniBand hybrid channel adapter/switch. The InfiniBand hybrid channel adapter/switch includes a plurality of InfiniBand ports, at least one addressed data bus interface, a memory for buffering data received by the plurality of InfiniBand ports and the at least one addressed data bus interface, and a transport layer engine for routing the data between the plurality of InfiniBand ports and the at least one addressed data bus interface. The InfiniBand hybrid channel adapter/switch also includes a plurality of transaction queues associated with each of the plurality of InfiniBand ports, the at least one addressed data bus interface and the transport layer engine, for storing transactions, and a transaction switch coupled to the plurality of transaction queues that routes the transactions between the plurality of InfiniBand ports, the addressed data bus interface and the transport layer engine.

In yet another aspect, it is a feature of the present invention to provide a method of transferring data in a network device comprising a plurality of packetized data devices, a plurality of addressed data devices, and at least one routing device. The method includes switching a packetized data transaction from a first of the plurality of packetized data devices to a second of the plurality of packetized data devices, and switching an addressed data transaction from a first of the plurality of addressed data devices to a second of the plurality of addressed data devices.

In yet another aspect, it is a feature of the present invention to provide a transaction switch in a network device having a buffer memory and plurality of data devices, including packetized and addressed data devices. The transaction switch includes a buffer manager for allocating portions of the buffer memory to the plurality of data devices on an as-needed basis, a plurality of data paths for providing the plurality of data devices access to the buffer memory, and a mapping table for storing packet destination identification information. The transaction switch also includes a plurality of transaction queues for transferring transactions between the transaction switch and the plurality of data devices, and control logic for selectively switching data between the plurality of data devices based on the mapping table information and in response to the transactions.

BRIEF DESCRIPTION OF THE DRAWINGS

These and other objects, features, and advantages of the present invention will become better understood with regard to the following description, and accompanying drawings where:

FIG. 8 is a block diagram of the format of a transaction sent by the Transaction Switch to a MAC output queue entry.

FIG. 9 is a block diagram of the format of transaction sent by the Transaction Switch to a Bus Router output queue entry.

FIG. 10 is a block diagram of the format of a transaction sent by the Transaction Switch to a PCI I/F output queue entry.

FIG. 12 is a flowchart illustrating operation of the Transaction Switch of FIG. 3 in switching transactions between the data devices of FIG. 3.

FIG. 13b is a flow diagram providing a visual illustration of some of the steps of FIG. 13a.

FIG. 14b is a flow diagram providing a visual illustration of some of the steps of FIG. 14a.

FIG. 15a is a flowchart illustrating operation of the Transaction Switch in switching an addressed data transaction to a packetized data transaction.

FIG. 15b is a flow diagram providing a visual illustration of some of the steps of FIG. 15a.

FIG. 18b is a flow diagram providing a visual illustration of some of the steps of FIG. 18a.

DETAILED DESCRIPTION

Figure 1:
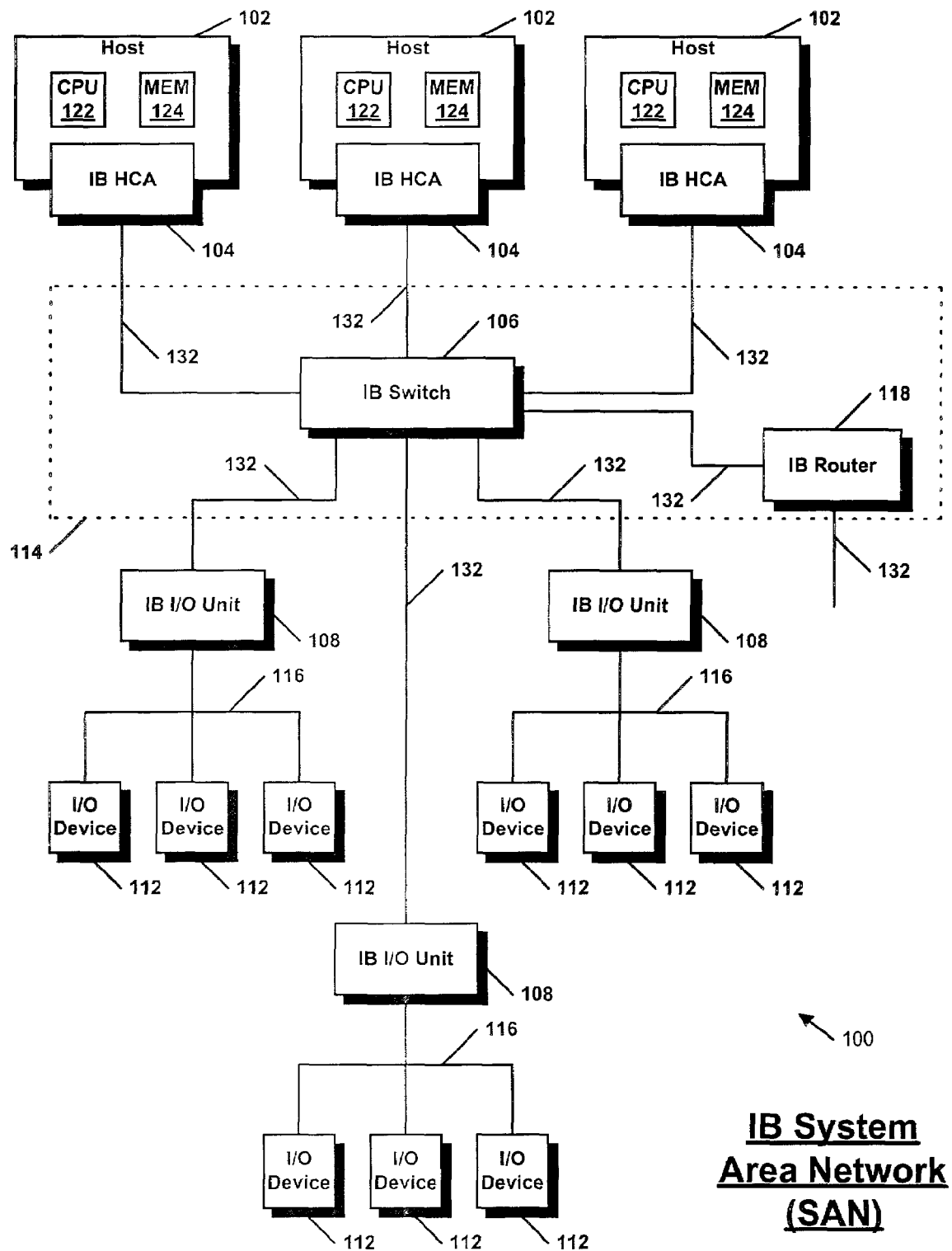
FIG. 1 is a block diagram of an InfiniBand System Area Network according to the present invention.

Referring to FIG. 1, a block diagram of an InfiniBand (IB) System Area Network (SAN) 100 according to the present invention is shown. IB SANs such as SAN 100 are described in detail in the InfiniBand Architecture Specification Volume 1 Release 1.0, Oct. 24, 2000, which is hereby incorporated by reference. The SAN 100 includes a plurality of hosts 102. The hosts 102 are IB processor end nodes, such as server computers, that comprise at least a CPU 122 and memory 124 complex. Each of the hosts 102 includes one or more IB Host Channel Adapters (HCA) 104 for interfacing the hosts 102 to an IB fabric 114. The IB fabric 114 is comprised of one or more IB Switches 106 and IB Routers 118 connected by a plurality of IB serial links 132. An IB link 132 comprises a full duplex transmission path between two IB devices in the IB fabric 114, such as IB switches 106, routers 118 or channel adapters 104. For example, an HCA 104 may be coupled to a host 102 via a PCI bus or the HCA 104 may be coupled directly to the memory and/or processor bus of the host 102.

The SAN 100 also includes a plurality of IB I/O units 108 coupled to the IB fabric 114. The IB hosts 102 and IB I/O units 108 are referred to collectively as IB end nodes. The IB end nodes are coupled by the IB switch 106 that connects the various IB links 132 in the IB fabric 114. The collection of end nodes shown comprises an IB subnet. The IB subnet may be coupled to other IB subnets (not shown) by the IB router 118 coupled to the IB switch 106.

Coupled to the I/O units 108 are a plurality of I/O devices 112, such as disk drives, network interface controllers, tape drives, CD-ROM drives, graphics devices, etc. The I/O units 108 may comprise various types of controllers, such as a RAID (Redundant Array of Inexpensive Disks) controller. The I/O devices 112 may be coupled to the I/O units 108 by any of various interfaces 116, including SCSI (Small Computer System Interface), Fibre-Channel, Ethernet, IEEE 1394, etc.

The I/O units 108 include IB Target Channel Adapters (TCAs) (not shown) for interfacing the I/O units 108 to the IB fabric 114. IB channel adapters, switches and routers are referred to collectively as IB devices. IB devices transmit and receive IB packets through the IB fabric 114. IB devices additionally buffer and route the IB packets as the packets traverse the IB fabric 114.

Figure 2:
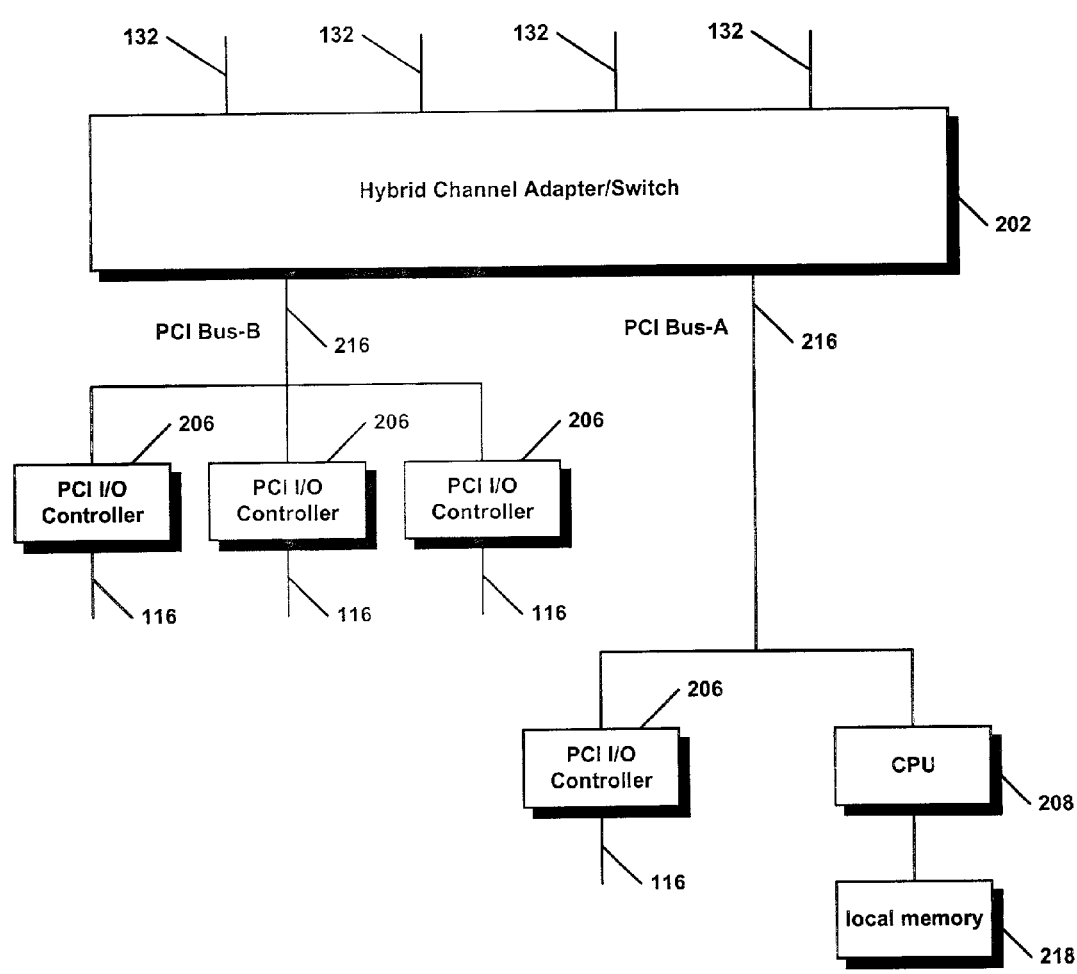
FIG. 2 is a block diagram of an InfiniBand hybrid channel adapter/switch according to the present invention.

Referring now to FIG. 2, a block diagram of an InfiniBand hybrid channel adapter/switch 202 according to the present invention is shown. The hybrid channel adapter/switch 202 combines the function of an IB switch, such as IB Switch 106 of FIG. 1, and the function of an IB Channel Adapter, such as IB HCA 104 of FIG. 1 or an IB TCA such as one included in an IB I/O Unit, such as I/O Unit 108 of FIG. 1. Preferably, the hybrid channel adapter/switch 202 is a single integrated circuit. Preferably, the hybrid channel adapter/switch 202 is capable of functioning simultaneously both as an IB channel adapter and an IB switch in an IB network. In another embodiment, the hybrid channel adapter/switch 202 is an integrated circuit capable of being incorporated into an IB node to function as an IB TCA, IB HCA, or an IB switch. Even if the hybrid channel adapter/switch 202 does not function simultaneously both as an IB channel adapter and an IB switch in an IB network, it is advantageous to have a single integrated circuit that is capable of being either a CA or a switch if the time to market is reduced over producing two separate parts.

The hybrid channel adapter/switch 202 is coupled to the IB fabric 114 of FIG. 1 by a plurality of IB serial links 132 of FIG. 1. The hybrid channel adapter/switch 202 is also coupled to two PCI buses 216, referred to as PCI Bus-A 216 and PCI Bus-B 216. Preferably, the PCI buses 216 are 66 MHz, 64-bit wide PCI buses, thereby being capable of supporting a theoretical maximum bandwidth of 8 Gbps (Gigabits per second) collectively to the hybrid channel adapter/switch 202. However, the present invention is not limited to any particular type of PCI bus, nor to any type of addressed data bus supporting any particular addressed data protocol.

A plurality of PCI I/O controllers 206 are coupled to the hybrid channel adapter/switch 202 by the PCI buses 216. The PCI I/O controllers 206 may be any of various I/O controllers such as PCI SCSI controllers, PCI Ethernet controllers, PCI Fibre-Channel controllers, PCI IEEE 1394 controllers, etc. An example of PCI I/O controller 206 is the Hewlett-Packard Tachyon PCI to Fibre-Channel I/O controller.

Coupled to one of the PCI buses 216 is a local CPU 208, for programming the hybrid channel adapter/switch 202 and 110 controllers 206. Coupled to the CPU 208 is a local memory 218 for storing programs and data for the CPU 208. In addition, the local memory 218 may be used to store data from the I/O controllers 206. For example, if the hybrid channel adapter/switch 202 is included in an I/O unit 108 that is a RAID controller performing RAID 5 operations, it may be desirable to buffer the data coming from the disks coupled to the I/O controllers 206 in the local memory 218 in order to perform the necessary exclusive OR operations. Among other things, the hybrid channel adapter/switch 202 is capable of performing Direct RDMA operations as described in U.S. Pat. No. 6,594,712 entitled INFINIBAND CHANNEL ADAPTER FOR PERFORMING DIRECT DMA BETWEEN PCI BUS AND INFINIBAND LINK, which is hereby incorporated by reference.

Although the hybrid channel adapter/switch 202 of FIG. 2 is shown in a configuration as a hybrid IB switch 106 and I/O Unit 108, the hybrid channel adapter/switch 202 of the present invention is readily adaptable to a hybrid IB switch 106 and IB HCA 104. For example, the hybrid channel adapter/switch 202 may be programmed by a CPU on a host node, such as CPU 122 on host 102 of FIG. 1 rather than I/O CPU 208. Furthermore, the hybrid channel adapter/switch 202 may be coupled to one or more PCI buses on a host 102 rather than PCI buses 216 in an I/O unit 108. Finally, the PCI controllers 206 coupled to the hybrid channel adapter/switch 202 may be PCI controllers 206 within a host 102 rather than in an I/O Unit 108.

Figure 3:
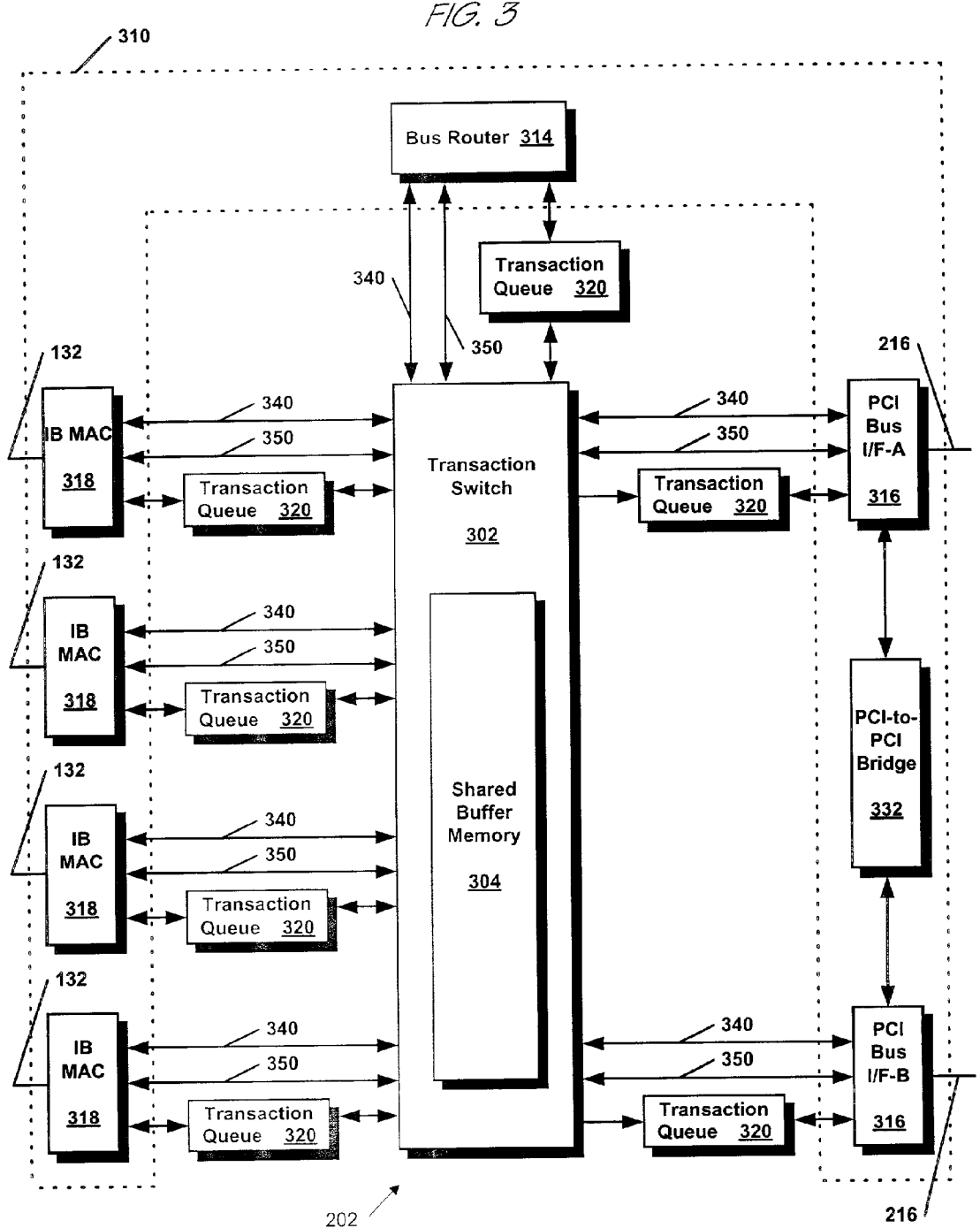
FIG. 3 is a block diagram of the hybrid channel adapter/switch 202 of FIG. 2 according to the present invention.

Referring to FIG. 3, a block diagram of the hybrid channel adapter/switch 202 of FIG. 2 according to the present invention is shown. The present invention is described in the context of a hybrid InfiniBand target channel adapter/switch, such as hybrid channel adapter/switch 202. However, the present invention is not limited to InfiniBand target channel adapter/switches, but is adaptable for operation in a hybrid host channel adapter/switch or router. That is, the present invention may be adapted for employment in any network device in which data must be buffered and routed between two different protocol interfaces.

The hybrid channel adapter/switch 202 comprises a plurality of IB Media Access Controllers (MAC) 318, a plurality of PCI I/Fs 316, and a Bus Router 314. The MACs 318, PCI I/Fs 316 and Bus Router 314 are referred to collectively as data devices or data interfaces 310. The hybrid channel adapter/switch 202 comprises a plurality of IB Media Access Controllers (MAC) 318 for coupling the hybrid channel adapter/switch 202 to the IB serial links 132 of FIG. 2. The IB MACs 318 are interfaces for the hybrid channel adapter/switch 202 to the IB physical layer. The IB MAC interfaces 318 perform buffering, packet formatting, flow control, error detection, and other physical and link layer management tasks. In addition, the MACs 318 parse incoming IB packets in order to generate transactions to post to a Transaction Switch 302. A transaction comprises a command or instruction to transfer data from one data device 310 to another.

The IB MACs 318 perform data transfers between the IB fabric 114 and the hybrid channel adapter/switch 202. The MACs 318 are packetized interfaces since they transmit and receive data in packets, such as InfiniBand packets.

A packet is a unit or bundle of data having a header that includes control or state information, such as source and destination address information, for the packet. Packets are transmitted or received by a data device or interface, such as the MACs 318, on a transmission medium, such as an IB link 132. The header also specifies the amount of data bytes included in the packet. Alternatively, the packets are a fixed size. Preferably, the packets also include error detection and correction information. Examples of packets are InfiniBand packets, Ethernet packets, IEEE 1394 (FireWire) packets, Fibre-Channel packets, Token Ring packets, SONET packets, and USB (Universal Serial Bus) packets.

The hybrid channel adapter/switch 202 further includes two PCI interfaces (I/F), referred to as PCI I/F-A 316 and PCI I/F-B 316, for coupling to the PCI buses 216 of FIG. 2.

Preferably, the PCI I/Fs 316 comprise both PCI master and PCI slave circuitry. Preferably, the PCI I/Fs 316 each include a PCI bus arbiter.

The PCI I/Fs 316 are addressed data interfaces since the address of the data transmitted or received is not included as a unit along with the data itself, in contrast to packetized data. Instead, an addressed data interface or device provides destination and/or source address information separately from the actual data to be transferred. Addressed data protocols are typically characterized by dedicated control signals that specify control information, such as addressing and phase information. This is in contrast to a packetized data protocol in which state or control information is contained within the packet itself, typically in the header portion of the packet. Typically with addressed data protocols, the state information provided by the control signals is time-dependent and must be decoded before or during data transfer. In contrast, packets may be stored and the state or control information in their headers may be decoded relatively long after the packet is transmitted. Examples of addressed data interfaces or buses are PCI bus, EISA bus, ISA bus, VESA bus, Sbus, and various processor buses such as Pentium processor buses, SPARC processor buses, MIPS processor buses, and DEC Alpha processor buses.

A PCI-to-PCI bridge 332 couples the two PCI I/Fs 316 together to facilitate data transfers between the two PCI buses 216. PCI-to-PCI bridges such as 332 that buffer PCI bus data only between PCI buses are well know in the art of computer systems having multiple PCI buses. Among other things, the bridge 332 enables the CPU 208 of FIG. 2 to program the I/O controllers 206 of FIG. 2 on PCI bus-B 216. The bridge 332 also enables the I/O controllers 206 to interrupt the CPU 208. Furthermore, the PCI-to-PCI Bridge 332 enables the I/O controllers 206 on PCI bus-B 216 to access the local memory 218 of FIG. 2. In one embodiment, the PCI-to-PCI Bridge 332 includes 16 KB of buffer memory for buffering data between the PCI I/Fs 316. In an alternate embodiment discussed below, the function of the PCI bridge 332 is performed within the Transaction Switch 302 using the shared buffer memory 304 similar to the manner in which the Transaction Switch 302 buffers and switches IB packets between the IB MACs 318 as described below with respect to FIGS. 16 through 18.

The PCI I/Fs 316 can receive PCI cycles initiated by the I/O controllers 206 or CPU 208 that target the PCI-to-PCI Bridge 332 or control/status registers (not shown) within the hybrid channel adapter/switch 202.

The hybrid channel adapter/switch 202 also includes a Bus Router (BR) 314. The Bus Router 314 is a device or interface that performs protocol translation or IB transport layer operations, such as work queue (WQ) processing, memory registration, partition key management, etc. In addition, the Bus Router 314 comprises a DMA (Direct Memory Access) engine for facilitating data transfers between the MACs 318 and the PCI I/Fs 316. The Bus Router 314 creates IB packets from addressed data received from the PCI I/Fs 316 by generating IB packet headers in front of addressed data received from a PCI bus 216. The IB packets are then transmitted by the MACs 318 on an IB link 132. Conversely, the Bus Router 314 processes the headers of IB packets received by the MACs 318 and instructs the PCI I/Fs 316 to transmit the payload data portion of the packets on the PCI buses 216. Thus, the Bus Router 314 is both a packetized data and addressed data device.

The hybrid channel adapter/switch 202 also includes a Transaction Switch (TSW) 302. The Transaction Switch 302 directs packetized data, addressed data and transactions between the data devices 310, i.e., the MACs 318, the Bus Router 314 and the PCI I/Fs 316.

Transactions are issued by a source data device 310 to the Transaction Switch 302. The Transaction Switch 302 determines which of the devices 310 is the destination of the transaction. The Transaction Switch 302 then modifies the transaction to an appropriate format based on the destination device 310 type and routes the modified transaction to the destination data device 310. Data is moved between the data devices 310 through shared buffer memory 304 in the Transaction Switch 302 as directed by transactions posted to the Transaction Switch 302 by the data devices 310.

The devices 310 transfer data between each other through the Transaction Switch 302 via data paths 340 that couple the devices to the Transaction Switch 302 as controlled by control signals 350 between the Transaction Switch 302 and data devices 310. In one embodiment, the data paths 340 between the MACs 318 and the Transaction Switch 302 comprise 32-bit data paths, the data paths 340 between the PCI I/Fs 316 and the Transaction Switch 302 comprise 64-bit data paths, and the data paths 340 between the Bus Router 314 and the Transaction Switch 302 comprise 64-bit data paths.

The data devices 310 perform transactions with one another through the Transaction Switch 302 via transaction queues 320. The transaction queues 320 couple the Transaction Switch 302 to each of the data devices 310. The transaction queues 320 comprise input queues and output queues, discussed in more detail below with respect to FIG. 5. The Transaction Switch 302 monitors input queues for transactions from the data devices 310 and submits transactions to the data devices 310 via output queues, discussed in more detail below.

Figure 4:
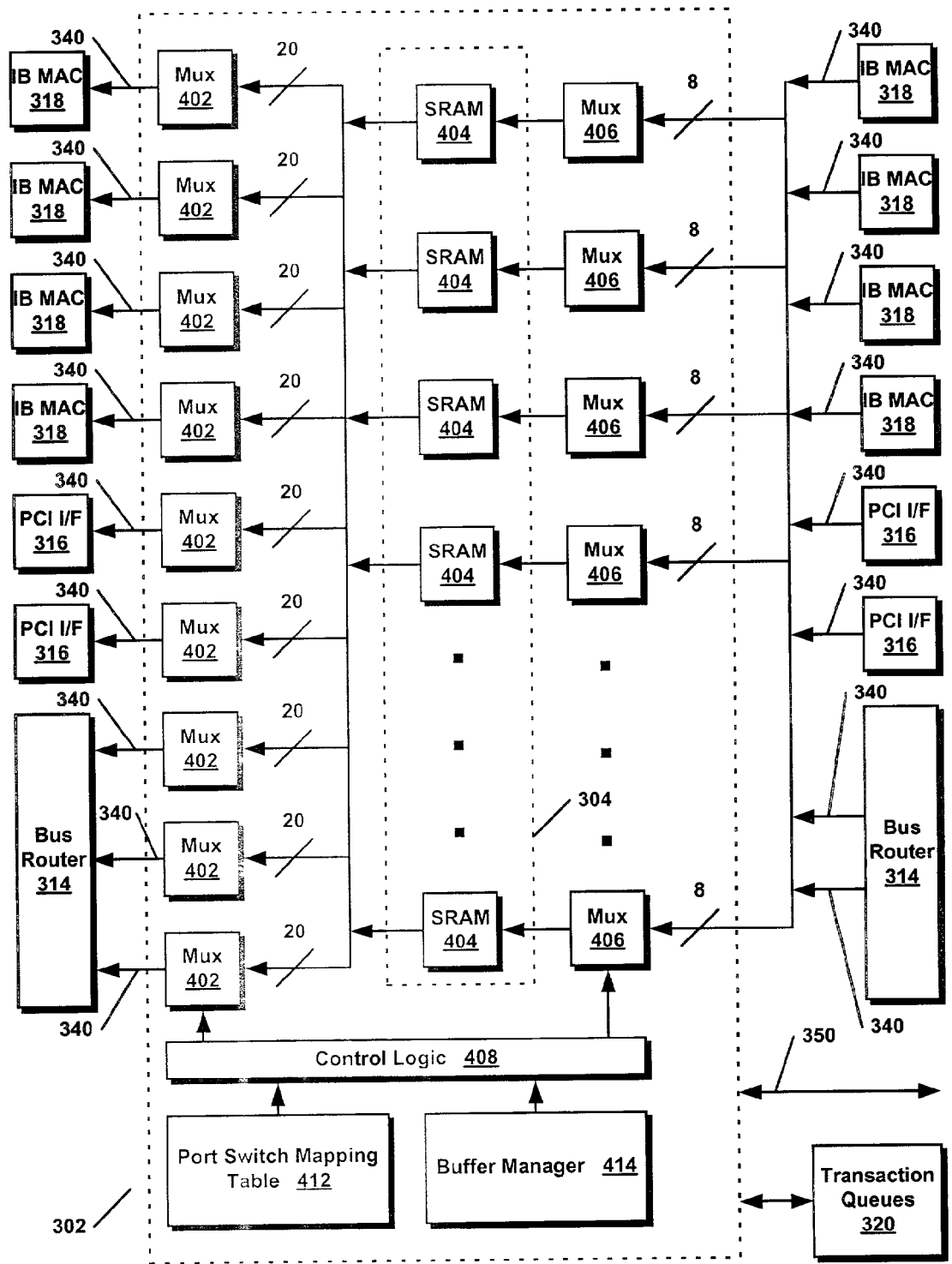
FIG. 4 is a block diagram illustrating data paths between the data devices and the Transaction Switch of FIG. 3.

The Transaction Switch 302 includes a shared buffer memory 304 for storing both packetized and addressed data for transfer between the data devices 310. Preferably, the Transaction Switch 302 is capable of simultaneously supporting to/from the shared buffer memory 304 four 32-bit reads by the MACs 318, four 32-bit writes by the MACs 318, two 64-bit reads and/or writes from the PCI I/Fs 316, three 64-bit Bus Router 314 reads and two 64-bit Bus Router 314 writes. FIG. 4 describes one embodiment of the shared buffer memory 304 in relation to the Transaction Switch 302.

Advantageously, the Transaction Switch 302 of the present invention allocates portions of the shared buffer memory 304 for the devices 310 to store packetized or addressed data received by the devices 310. The allocated portions of the shared buffer memory 304 are referred to as buffers for brevity. Furthermore, Transaction Switch 302 allocates buffers upon a device posting transactions and de-allocates the allocated buffers upon completion of the transactions. Finally, the Transaction Switch 302 allows the devices 310 to access the data via data paths in the Transaction Switch 302. By allowing the devices 310 to utilize the buffer memory 304 in a shared manner, on an as needed basis, the Transaction Switch 302 of the present invention advantageously realizes a more efficient use of buffer memory than conventional solutions that dedicate fixed portions of buffer memory to receive packetized data and dedicate other fixed portions of buffer memory to receive addressed data.

Tables 1 through 4 below describe in detail various bits of the control signals 350. In the tables, "T.S." denotes Transaction Switch 302, "B.R." denotes Bus Router 314, "MAC" denotes MACs 318, and "PCI" denotes PCI I/Fs 316.

TABLE 1

Transaction Switch to Transmit MAC Interface

| Signal | Source | Description |
|---|---|---|
| tsw_vl0_rdy | T.S. | Set when there is a ready output packet in VL0 Output Queue |
| tsw_vl0_length [10:0] | T.S. | The length (in words) of that VL0 packet |
| tsw_vl1_rdy | T.S. | Set when there is a ready output packet in VL1 Output Queue |
| tsw_vl1_length [10:0] | T.S. | The length (in words) of that VL1 packet |
| tsw_vl15_rdy | T.S. | Set when there is a ready output packet in VL15 Output Queue |
| tsw_vl15_length [10:0] | T.S. | The length (in words) of that VL15 packet |
| mac_vl_sel [1:0] | MAC | The MAC's choice for which packet to send next (00 = VL0, 01 = VL1, 11 = VL15, 10 = undefined) |
| mac_tx_rd | MAC | MAC reads another dword of data from transaction switch memory |
| mac_tx_done | MAC | Asserted when the current output transaction has completed |
| tsw_data_valid | T.S. | Indicates the data bus is valid. |
| tsw_data [31:0] | T.S. | The packet data from memory to be transmitted. |

TABLE 2

Transaction Switch to Receive MAC Interface

| Signal | Source | Description |
|---|---|---|
| mac_transaction [44:6] | MAC | The MAC Input transaction. (bits 5:0 are provided by the T.S.) |
| mac_transaction_rdy | MAC | A signal indicating that the MAC input transaction is loaded. This is the last thing that the MAC does for this transaction. |
| mac_data_wr | MAC | Set when the data is to be written into the T.S. |
| mac_data [31:0] | MAC | The packet data that the MAC writes into the T.S. |
| mac_resource_rdy | T.S. | Indicates input queue entries are available for VL0 or VL1. |
| mac_vl15_resource_rdy | T.S. | Indicates input queue entries are available for VL15. |

TABLE 3

Transaction Switch to Bus Router Interface

| Signal | Source | Description |
|---|---|---|
| tsw_rxpkt_data [63:0] | T.S. | RX Packet Data |
| brt_rxpkt_addr [9:0] | B.R. | RX Packet Address (in quadwords) |
| brt_rxpkt_block [5:0] | B.R. | RX Packet Data Block |
| brt_rxpkt_rd | B.R. | RX Packet Read |
| brt_txpkt_data [63:0] | B.R. | TX Packet Data |
| brt_txpkt_addr [9:0] | B.R. | TX Packet Address (in quadwords) |
| brt_txpkt_block [5:0] | B.R. | TX Packet Data Block |
| brt_txpkt_wr | B.R. | TX Packet Write |
| brt_cmplt_data [63:0] | B.R. | Completion Data |

TABLE 3-continued

Transaction Switch to Bus Router Interface

| Signal | Source | Description |
|---|---|---|
| brt_cmplt_addr [5:0] | B.R. | Completion Address (in quadwords) |
| brt_cmplt_block [5:0] | B.R. | Completion Data Block |
| brt_cmplt_wr | B.R. | Completion Write |
| brt_input_trans [103:0] | B.R. | Input Queue transaction |
| brt_trans_rdy | B.R. | New input transaction posted |
| tsw_next_avail_block [5:0] | T.S. | Next available data block address |
| brt_block_used | B.R. | Indicates next_avail_block used |
| tsw_input_trans_complete | T.S. | BR Input transaction has completed |
| tsw_trans_tag [3:0] | T.S. | Completed BR input transaction's tag |
| tsw_trans_error [3:0] | T.S. | Completed BR transaction PCI error bits |
| tsw_output_trans [30:0] | T.S. | Output Queue Transaction |
| tsw_new_out_trans | T.S. | New Output Queue Transaction indicator |
| brt_output_trans_complete | B.R. | Output Transaction has completed |
| brt_output_trans_port [1:0] | B.R. | Completed Output Transaction Port |
| brt_output_trans_vl [1:0] | B.R. | Completed Output Transaction Virtual Lane |
| brt_deallocate_block | B.R. | Asserted to de-allocate a block |
| brt_deallocate_block_addr [5:0] | B.R. | The variable memory block to be de-allocated |

TABLE 4

Transaction Switch to PCI Interface

| Signal | Source | Description |
|---|---|---|
| pci_req_ack_pclk | PCI | Acknowledge indicating PCI has accepted the new transaction request. |
| pci_trans_cmplt_pclk | PCI | Indicates that PCI has completed a transaction. |
| pci_trans_tag_pclk [3:0] | PCI | The transaction tag for the completed transaction. |
| pci_error_status_pclk [3:0] | PCI | Indicates what error occurred if any. |
| pci_rd_req_pclk | PCI | Request from PCI to read transaction switch memory. |
| pci_rd_byte_cnt_pclk [12:0] | PCI | The byte count for the read request. |
| pci_rd_block_addr_pclk [5:0] | PCI | The TS block address for the read request. |
| pci_rd_mem_addr_pclk [12:0] | PCI | The memory address for the read request. |
| pci_rd_pci_addr_pclk [2:0] | PCI | The destination PCI address for the read request (for alignment) |

TABLE 4-continued

Transaction Switch to PCI Interface

| Signal | Source | Description |
|---|---|---|
| pci_rd_strobe_pclk | PCI | Indicates that a data transfer has occurred on PCI and the TS fifo should remove the entry at the top. |
| pci_rd_ahead_pclk [1:0] | PCI | Allows PCI to look ahead into the TS fifo in order to buffer up data in preparation for a data transfer without removing the data from the FIFO. |
| pci_wr_data_valid_pclk | PCI | Indicates a PCI data transfer occurred and the data should be placed into the TS FIFO. |
| pci_wr_block_addr_pclk [5:0] | PCI | The block address where the write data should be written. |
| pci_wr_mem_addr_pclk [12:0] | PCI | The memory address where the write data should be written. |
| pci_wr_data_pclk [63:0] | PCI | The write data that will be written into the TS memory. |
| pci_wr_last_data_pclk | PCI | Indicates the current data transfer is the last one for the transaction. |
| pci_wr_byte_en_pclk [7:0] | PCI | Indicates which of the byte lines for the write data are valid. |
| tsw_req | T.S. | Indicates that the TS has a new transaction destined for PCI. |
| tsw_req_tag [3:0] | T.S. | The tag number for the current transaction request. |
| tsw_pci_addr [63:0] | T.S. | The PCI address for the current transaction request. |
| tsw_byte_cnt [12:0] | T.S. | The byte count for the current transaction request. |
| tsw_pci_write | T.S. | The cycle type for the current transaction request. |
| tsw_block_addr [5:0] | T.S. | The block address for the current transaction request. |
| tsw_mem_addr [12:0] | T.S. | The memory address for the current transaction request |
| tsw_done_ack | T.S. | Acknowledge indicating the completion strobe has been synchronized. |
| tsw_rd_data [63:0] | T.S. | The data read from the TS memory. |
| tsw_rd_be_n [7:0] | T.S. | The byte enables for the read data which are generated during alignment. |
| tsw_rd_last_data | T.S. | Indicates the current read data is the last read data for the transaction. |
| tsw_rd_data_valid | T.S. | Indicates that the current read data is valid. |

Referring now to FIG. 4, a block diagram illustrating data paths between the data devices 310 and the Transaction Switch 302 of FIG. 3 is shown. The data devices 310, i.e., Bus Router 314, PCI I/Fs 316, and MACs 318, are shown on both the far left-hand and right-hand sides of FIG. 4 for simplification, although they exist only once. The devices 310 on the left-hand side illustrate the input data path portions and the devices 310 on the right-hand side illustrate the output data path portions. FIG. 4 illustrates one embodiment of the Transaction Switch 302 and shared buffer memory 304 of FIG. 3 in detail.

In the embodiment of FIG. 4, the shared buffer memory 304 comprises a plurality of SRAMs (static random access memories) 404. The Transaction Switch 302 comprises a plurality of read port multiplexers (muxes) 402 and write port multiplexers 406, coupled between the SRAMs 404 and the devices 310, and control logic 408 for controlling the plurality of muxes 402 and 406.

In one embodiment, the shared buffer memory 304 comprises 20 SRAMs 404. Each SRAM 404 has two ports for reading and writing. Each SRAM 404 is capable of storing 8448 bytes of data, arranged as 1056 rows of 64-bits each. Preferably, each SRAM 404 is arranged as two separately addressable 4224-byte buffers for buffering incoming packetized or addressed data. That is, each of the 40 buffers is separately addressable by the devices 310 for read and write access via data paths 340. Furthermore, each data location within the SRAMs 404 is advantageously individually addressable. That is, the data devices 310 may read/write data at offsets from the beginning of an SRAM 404.

In another embodiment, the SRAMs 404 are arranged as smaller chunks of buffer space, preferably 256 bytes each, each chunk being separately allocable and addressable. Multiple chunks are allocated as needed to buffer packetized or addressed data as received. However, the present invention is not limited to any particular number of buffers, and the present invention is adaptable to various numbers of buffers and memory types.

In the embodiment shown, the Transaction Switch 302 comprises 9 read port muxes 402. The read port muxes 402 outputs are coupled to the data device 310 inputs via data paths 340. Preferably, the Transaction Switch 302 includes one data path input or port 340 for each of the four MACs 318 and the two PCI I/Fs 316. Preferably, the Transaction Switch 302 includes three data path inputs or ports 340 for the Bus Router 314. Each of the read port muxes 402 receives 20 inputs, one from each of the SRAM 404 outputs.

The control logic 408 controls the read port muxes 402 to select one of the SRAM 404 outputs for provision to the associated data device 310 in response to control signals 350 from the devices 310 and transactions posted by the devices 310 via the transaction queues 320. In addition, the control logic 408 controls the muxes 402 in response to information received from a port switch mapping table 412 and a buffer manager 414, as described below in more detail. Furthermore, the control logic 408 receives transactions from the input queues 502, determines the destination output queue 504, modifies the transactions appropriately for the destination output queue 504, and sends the modified transaction to the destination output queue 504.

In one embodiment, the buffer manager 414 allocates the shared buffer memory 304 substantially in accordance with the invention described in co-pending U.S. patent application Ser. No. 09/740,694 entitled METHOD AND APPARATUS FOR OVER-ADVERTISING LNFINIBANI) BUFFERING RESOURCES (BAN:0104), filed Dec. 19, 2000, which is hereby incorporated by reference.

In the embodiment shown, the Transaction Switch 302 comprises 20 write port muxes 406. The write port mux 406 outputs are coupled to a corresponding one of the 20 SRAMs

404. Preferably, the Transaction Switch 302 includes two data path outputs or ports 340 for the Bus Router 314. Each of the write port muxes 406 receives 8 data path inputs 340, one from each of the four MACs 318 and the two PCI I/Fs 316 and two from the Bus Router 314. The control logic 408 controls the write port muxes 406 to select one of the data device 310 data paths 340 for provision to the associated SRAM 404 in response to control signals 350 from the devices 310 and transactions posted by the devices 310 via the transaction queues 320. In addition, the control logic 408 controls the muxes 406 in response to information received from a port switch mapping table 412 and a buffer manager 414, as described below in more detail.

Figures 5, 6, 7:
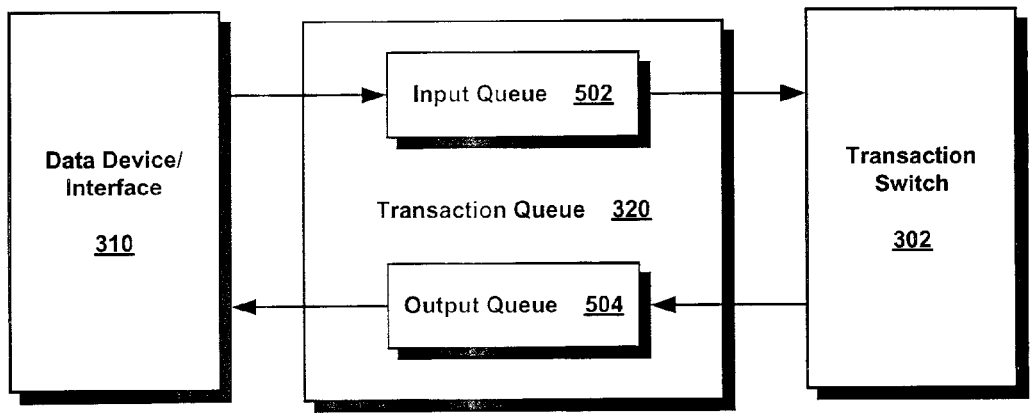
FIG. 5 is a block diagram of a transaction queue of FIG. 3 according to the present invention.
FIG. 6 is a block diagram of the format of a transaction posted by a MAC in an entry of a MAC input queue.
FIG. 7 is a block diagram of the format of a transaction posted by the Bus Router of FIG. 3 in its input queue entry.

Referring now to FIG. 5, a block diagram of a transaction queue 320 of FIG. 3 according to the present invention is shown. The transaction queue 320 comprises an input queue 502 and an output queue 504. The input queue 502 and output queue 504 are named for the direction of transaction flow relative to the Transaction Switch 302. The input queue 502 receives transactions posted by a data device 310 and provides the transactions to the Transaction Switch 302. Conversely, the output queue 504 receives transactions from the Transaction Switch 302 and provides the transactions to a data device 310.

The input queue 502 and output queue 504 each include multiple entries, or slots, for storing transactions. Preferably, each input queue 502 entry is individually readable by the Transaction Switch 302 and individually writeable by its corresponding device 310. Likewise, preferably each output queue 504 entry is individually readable by its corresponding device 310 and individually writeable by the Transaction Switch 302. Preferably, each entry includes a valid bit for specifying whether an entry contains a valid transaction. Preferably, a transaction count is maintained for each input queue 502 and output queue 504 that specifies the number of valid entries present.

The various slot, or entry, formats for a transaction in the input queue 502 and output queue 504 of each of the various devices 310 will now be described with respect to FIGS. 6-10. In one embodiment, the transaction queue 320 associated with each of the PCI I/Fs 316 does not include an input queue 502.

In one embodiment, the transaction queues 320 comprise dual-ported RAM (random access memory), to facilitate simultaneous reads and writes. In another embodiment, the transaction queues 320 comprise registers. In one embodiment, the transaction queue 320 for each MAC 318 comprises one output queue 504 for each IBA virtual lane supported by a MAC 318.

Referring now to FIG. 6, a block diagram of the format of a transaction 600 posted by a MAC 318 in an entry, or slot, of a MAC 318 input queue 502 is shown. The MAC 318 input queue 502 transaction 600 includes the following fields: an InfiniBand destination local ID (DLID) 602, a Frame Error bit 604, an InfiniBand LNH (link next header) bit 606, an InfiniBand Destination QP (Queue Pair) field 608, an InfiniBand packet length field 612, an InfiniBand VL (virtual lane) field 614, and a shared buffer memory 304 buffer address field 616. When a MAC 318 receives an InfiniBand packet, the MAC 318 generates a transaction 600 and posts the transaction 600 to its input queue 502 as described in steps 1308 and 1408 of FIGS. 13a and 14a, respectively.

When a MAC 318 receives an IB packet, it parses the packet and populates the DLID field 602, the LNH bit 606, the packet length field 612, and the VL field 614 with the values received in the corresponding fields of the IBA local routing header of the incoming IBA packet. In addition, the MAC 318 sets the LNH 606 bit if the LNH bit of the local routing header of the IB packet is set. Similarly, the MAC 318 populates the Destination QP field 608 with the value in the corresponding field of the base transport header of the incoming packet.

If the MAC 318 detects an error in the incoming packet, the MAC 318 sets the Frame Error bit 604 in the input queue 502 entry. The buffer address 616 specifies one of the buffers in the shared buffer memory 304 of FIG. 3. In one embodiment, the buffer address field comprises a 6-bit buffer address. Preferably, the Transaction Switch 302 provides the value for the buffer address 616 upon allocation of a buffer in the shared buffer memory 304, as described below with respect to steps 1306 and 1406 of FIGS. 13a and 14a, respectively. In one embodiment in which multiple buffers or chunks may be allocated in the shared buffer memory 304 to receive packetized or addressed data, the buffer address field 616 comprises multiple addresses for specifying multiple buffers or chunks within the shared buffer memory 304.

Referring now to FIG. 7, a block diagram of the format of a transaction 700 posted by the Bus Router 314 of FIG. 3 in its input queue 502 entry, or slot, is shown. The Bus Router 314 input queue 502 transaction 700 includes the following fields: a transaction Tag field 702, a PCI Address/Port field 704, a Length field 706, an Offset field 708, an InfiniBand (virtual lane) VL field 712, a Type field 714 and a buffer address 716 field. When the Bus Router 314 wants to cause an InfiniBand packet to be transmitted out a MAC 318 or to cause data to be transferred on a PCI bus 216 of FIG. 2 by a PCI I/F 316, the Bus Router 314 posts a transaction 700 in its input queue 502 to the Transaction Switch 302.

The transaction Tag field 702 specifies a transaction number used by the Bus Router 314 to uniquely identify outstanding transactions issued to the MACs 318 and PCI I/Fs 316. When a MAC 318 or PCI I/F 316 completes a transaction posted by the Bus Router 314, the MAC 318 or PCI I/F 316 notifies the Bus Router 314 using the Tag field 702 value. The Tag 702 value allows the Bus Router 314 to determine from among multiple outstanding transactions issued, which of the outstanding transactions has completed. This enables the Bus Router 314 to perform any necessary post-transaction processing.

If the transaction is destined for one of the PCI I/Fs 316, the Transaction Switch 302 populates the PCI Address/port field 704 with the PCI address on the associated PCI bus 216 to or from which data is to be transferred. In contrast, if the transaction is destined for one of the MACs 318, the Transaction Switch 302 populates the PCI address/port field 704 with a two-bit port number corresponding to the destination MAC 318. The length field 706 specifies the number of bytes of data to be transferred, in either an InfiniBand packet or a PCI burst.

The offset field 708 specifies an offset within the buffer allocated from the shared buffer memory 304 at which the data transfer is to begin. For example, an InfiniBand packet is received by a MAC 318 and stored in a buffer in the shared buffer memory 304. Advantageously, the offset field 708 enables the Bus Router 314 to subsequently specify the offset of the payload portion within the InfiniBand packet when posting a transaction 700 instructing a PCI I/F 316 to transfer only the payload portion from the buffer. Thus, the PCI I/F 316 will transfer only the payload data to an I/O controller 206 or local memory 218 of FIG. 2, omitting the InfiniBand packet header portion. In this case, the Bus Router 314 would specify an offset 708 equal to the size of the InfiniBand header, assuming the packet was stored at offset 0 within the buffer. Conversely, the Bus Router 314 may use the offset field 708 to command the PCI I/F 316 to transfer data into the buffer at an offset so as to leave room for the Bus Router 314 to write an IB header into the buffer ahead of the data. Advantageously, the offset field 708 enables the Bus Router 314 to translate from the InfiniBand packetized data protocol to the PCI addressed data protocol or vice versa.

The VL field 712 specifies the InfiniBand virtual lane in which the packet is to be transmitted by the destination MAC 318. The Type field 714 is a two-bit field specifying the type of transaction. Preferably, a binary value of 00 specifies a PCI read, 01 specifies a PCI write, 10 specifies an InfiniBand write and 11 is unused. The buffer address field 716 is supplied by the Transaction Switch 302 in a manner similar to that described above with respect to the buffer address field 616 of FIG. 6.

Referring now to FIG. 8, a block diagram of the format of a transaction 800 sent by the Transaction Switch 302 to a MAC 318 output queue 504 entry, or slot, is shown. The MAC 318 output queue 504 entry 800 includes the following fields: a Not Raw field 802, a transaction Tag 804, an InfiniBand packet length field 806, an InfiniBand VL field 808, and a shared buffer memory 304 buffer address field 812.

When one of the devices 310 desires to have a MAC 318 transmit an InfiniBand packet, the device 310 posts a transaction to the Transaction Switch 302 via its associated input queue 502. When the Transaction Switch 302 receives the transaction, the Transaction Switch 302 modifies the transaction to the format 800 shown and posts the transaction 800 in the destination MAC 318 output queue 504, as described with respect to steps 1314 and 1528 of FIGS. 13*a* and 15*a*, respectively.

The transaction Tag field 804, the packet length field 806, VL field 808 and the buffer address field 812 are populated based on the transaction Tag field 702, the length field 706, the VL field 712 and the buffer address field 716 of the Bus Router 314 input queue 502 entry 700 of FIG. 7. That is, the buffer address field 812 specifies the address of the buffer in the shared buffer memory 304 currently storing the outgoing packet. If the InfiniBand packet to be transmitted is not an InfiniBand raw packet, then the Transaction Switch 302 sets the Not Raw bit 802 in the entry 800.

Referring now to FIG. 9, a block diagram of the format of transaction 900 sent by the Transaction Switch 302 to a Bus Router 314 output queue 504 entry, or slot, is shown. The Bus Router 314 output queue 504 entry 900 includes the following fields: a port field 902, a Frame Error bit 904, an InfiniBand LNH bit 906, an InfiniBand Destination QP field 908, an InfiniBand packet length field 912, an InfiniBand VL field 914, and a shared buffer memory 304 buffer address field 916.

When the Transaction Switch 302 receives a MAC 318 input queue 502 transaction 600 of FIG. 6 destined for the Bus Router 314, it creates a Bus Router 314 output queue 504 transaction 900 by copying the MAC 318 input queue 502 entry 600 fields to the Bus Router 314 output queue 504 entry 900, with two modifications. First, the DLID field 602 of FIG. 6 is dropped. Second, the Port field 902 is populated with a two-bit value specifying which of the four MACs 318 received the incoming InfiniBand packet causing the MAC 318 input queue 502 entry 600 to be generated.

Referring now to FIG. 10, a block diagram of the format of a transaction 1000 sent by the Transaction Switch 302 to a PCI I/F 316 output queue 504 entry, or slot, is shown. The PCI I/F 316 output queue 504 entry 1000 includes the following fields: a transaction Tag field 1002, a PCI Address field 1004, a Length field 1006, an Offset field 1008, a PCI Type field 1012 and a buffer address field 1014 field.

When the Transaction Switch 302 receives a Bus Router 314 input queue 502 transaction 700 of FIG. 7 destined for PCI I/F 316, it creates a PCI I/F 316 output queue 504 entry 1000 by copying the Bus Router 314 input queue 502 entry 700 fields to the PCI I/F 316 output queue 504 entry 1000, with two modifications. First, VL field 712 is dropped. Second, only the least significant bit of the Type field 714 is copied to the PCI Type field 1012, i.e., to specify the direction of the PCI data transfer. As will be discussed below, the offset field 1008 advantageously enables translation between packetized data protocols and addressed data protocols within the shared buffer memory 304.

Figure 11:
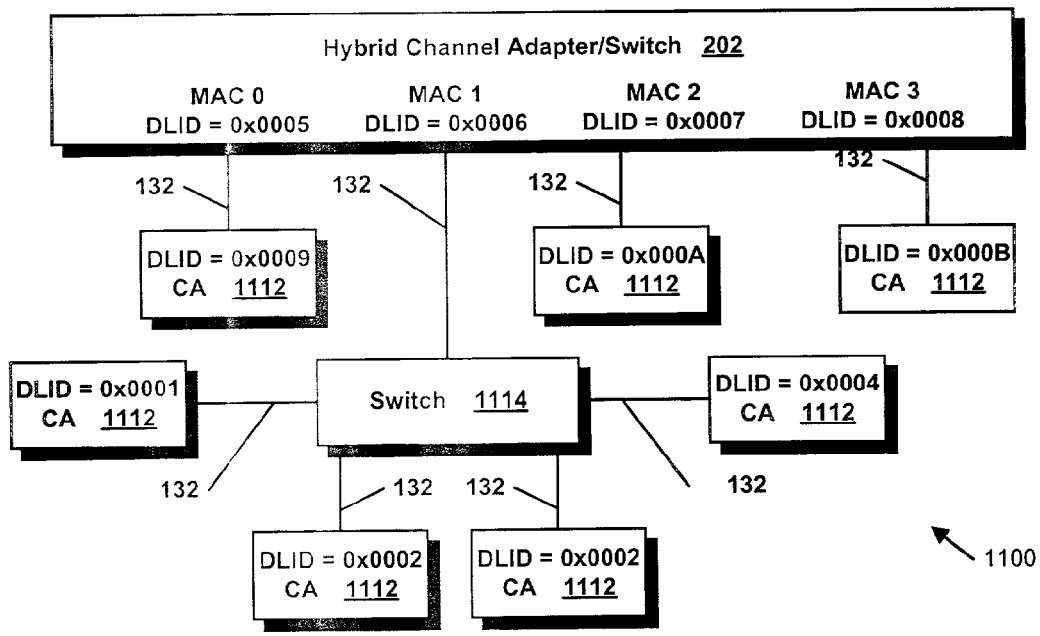
FIG. 11 is a block diagram illustrating the port switch mapping table of FIG. 4 according to the present invention in an example IB network.

Referring now to FIG. 11, a block diagram illustrating the port switch mapping table 412 of FIG. 4 according to the present invention in an example IB network 1100 is shown. The table 412 includes a plurality of rows comprising mapping entries. In the embodiment shown in FIG. 11, the table 412 includes 16 entries. Each entry includes a bus router bit 1102, a port field 1104, an InfiniBand DLID (destination local ID) field 1106, and a valid bit 1108. Preferably, the table 412 is programmable by the CPU 208 based on disseminated InfiniBand subnet management configuration information.

When one of the MACs 318 receives an InfiniBand packet and correspondingly posts a MAC 318 input queue 502 transaction 600 of FIG. 6 to the Transaction Switch 302 of FIG. 3, the Transaction Switch 302 attempts to match the transaction 600 DLID 602 with a DLID field 1106 in one of the table 412 entries to determine the destination of the transaction 600. The Transaction Switch 302 uses the table 412 to determine whether the transaction 600 is destined for the Bus Router 314 or for one of the MACs 318, and if for one of the MACs 318, which one of them, as described with respect to FIG. 12 below.

An entry in the table 412 having a bus router bit 1102 with a value of 1 indicates a transaction 600 with a DLID 602 that matches the DLID 1106 in an entry in the table 412 is destined for the Bus Router 314. If the Bus Router bit 1102 is 0, then a transaction 600 with a DLID 602 that matches the DLID 1106 in a valid entry in the table 412 is destined for one of MAC 0 through MAC 3 as specified in the two-bit port field 1104. Thus, the bus router bit 1102 enables the hybrid channel adapter/switch 202 to function as an InfiniBand switch by receiving an InfiniBand packet into one of the MACs 318 and transmitting the packet out another MAC 318.

The example network 1100 includes a hybrid channel adapter/switch 202 of FIG. 3 with the MACs 318, or ports, numbered MAC 0, MAC 1, MAC 2, and MAC 3, having example IBA DLIDs 0x0005, 0x0006, 0x0007, and 0x0008, respectively, within the IBA subnet 1100. MAC 0 is coupled by an IB link 132 to an IB channel adapter (CA) 1112 having a DLID 0x0009. MAC 2 is coupled by an IB link 132 to an IB CA 1112 having a DLID 0x000A. MAC 3 is coupled by an IB link 132 to an IB CA 1112 having a DLID 0x000B. MAC 1 is coupled by an IB link 132 to an IB switch 1114. Four CA's 1112 having DLIDs 0x0001, 0x0002, 0x0003, and 0x0004, respectively, are coupled to the switch 1114 by IB links 132.

The table 412 shown in FIG. 11 illustrates an example of a populated port switch mapping table 412 corresponding to the network 1100 of FIG. 11. DLIDs 0x0005 through 0x0008 occupy entries 0 through 3 of the table 412. Consequently, the entries 0 through 3 have their bus router bits 1102 and valid bits set to 1 to enable the hybrid channel adapter/switch 202 advantageously to function as an IB channel adapter for transactions 600 corresponding to IB packets having DLIDs directed to the MACs 318.

DLIDs 0x0001 through 0x0004, which correspond to IB ports downstream in the IB fabric 114 from the MAC 1, occupy entries 4 through 7 of the table 412. Consequently, entries 4 through 7 have their valid bits 1108 set, but do not have their bus router bits 1102 set, since IB packets received for these DLIDs are not destined for the hybrid channel adapter/switch 202 functioning as a channel adapter, but rather as an IB Switch. Entries 4 through 7 have their port field 1104 set to 1 to correspond to MAC 1, i.e., port 1.

DLIDs 0x0009 through 0x000B, which correspond to IB ports downstream in the IB fabric 114 from the MAC 0, MAC 2, and MAC 3, respectively, occupy entries 8 through 10 of the table 412. Consequently, entries 8 through 10 have their valid bits 1108 set, but do not have their bus router bits 1102 set, since IB packets received for these DLIDs are not destined for the hybrid channel adapter/switch 202 functioning as a channel adapter, but rather as an IB Switch. Entry 8 has its port field 1104 set to 0 to correspond to MAC 0, i.e., port 0, to which it is connected. Entry 9 has its port field 1104 set to 2 to correspond to MAC 2, i.e., port 2, to which it is connected. Entry 10 has its port field 1104 set to 3 to correspond to MAC 3, i.e., port 3, to which it is connected.

As may be observed from the foregoing, entries 4 through 10 of the table 412 advantageously enable the hybrid channel adapter/switch 202 to function as an IB switch for transactions 600 corresponding to IB packets directed to IB ports other than the MACs 318, i.e., to downstream IB nodes 1112.

In addition, the bus router bit 1102 enables the hybrid channel adapter/switch 202 to function in a loopback mode, by receiving an InfiniBand packet into one of the MACs 318 and transmitting the packet out the same MAC 318. The loopback mode may be accomplished by programming an entry in the table 412 with the bus router bit 1102 set to 0, the DLID field 1106 set to the DLID of the MAC 318 to be placed in loopback mode, and the port field 1104 set to the value of the MAC 318 to be placed in loopback mode. Entry 15 in table 412 illustrates an example of an entry for performing the loopback function on MAC 2 since the bus router bit 1102 is 0, the valid bit 1108 is 1, the DLID 1106 is 0x0007 (the DLID for MAC 2) and the port field 1104 is 2, which will cause the packet to be routed back to MAC 2.

Entries 11 through 14 in the table 412 are not used and consequently have their valid bits 1108 set to 0.

Referring now to FIG. 12, a flowchart illustrating operation of the Transaction Switch 302 of FIG. 3 in switching transactions between the data devices 310 of FIG. 3 is shown. FIG. 12 illustrates operation of the Transaction Switch 302 upon reception of a transaction posted by one of the data devices 310 in an input queue 502 of FIG. 5.

A MAC 318 posts a transaction 600 of FIG. 6 in its input queue 502, in step 1202. The Transaction Switch 302 examines the transaction 600 and determines whether a frame error has occurred by examining the frame error bit 604 of the transaction 600, in step 1204. If a frame error has occurred, the Transaction Switch 302 modifies the transaction 600 into a Bus Router 314 output queue 504 transaction 900 and sends the modified transaction 900 to a slot in the Bus Router 314 output queue 504, in step 1206. The Bus Router 314 sets the frame error bit 904 of the Bus Router 314 output queue 504 transaction 900 and sets the port field 902 to indicate which of the MACs 318 received the packet with the frame error.

If no frame error occurred, the Transaction Switch 302 looks up the DLID 602 specified in the transaction 600 in the mapping table 412 of FIG. 11 and determines whether the transaction 600 DLID 602 matches any of the entries in the mapping table 412, in step 1208. If the transaction 600 DLID 602 does not match any of the table 412 entries, this condition is treated as an error, and the Transaction Switch 302 modifies the transaction 600 into a Bus Router 314 output queue 504 transaction 900 and sends the modified transaction 900 to the Bus Router 314 output queue 504, in step 1206.

If a DLID 602 match occurs, the Transaction Switch 302 determines whether the bus router bit 1102 in the matching mapping table 412 entry is set, in step 1212. If the bus router bit 1102 is set, the Transaction Switch 302 modifies the transaction 600 to a Bus Router 314 output queue 504 transaction 900 and sends the modified transaction 900 to the Bus Router 314 output queue 504, in step 1206. Otherwise, the Transaction Switch 302 modifies the transaction 600 into a MAC 318 output queue 504 transaction 800 and sends the modified transaction 800 to a slot in the destination MAC 318 output queue 504, in step 1214.

The Bus Router 314 posts a transaction 700 of FIG. 7 in its input queue 502, in step 1222. The Transaction Switch 302 examines the transaction 700 and determines whether it is destined for a MAC 318 by examining the Type field 714 of the transaction 700, in step 1232. If the transaction 700 is destined for a MAC 318, i.e., if the Type field 714 value is binary 10 to specify an InfiniBand write, then the Transaction Switch 302 modifies the transaction 700 into a MAC 318 output queue 504 transaction 800 and sends the modified transaction 800 to a slot in the MAC 318 output queue 504 based on the port value specified in the PCI Address/Port field 704, in step 1234.

If the transaction 700 is not destined for a MAC 318, i.e., if the Type field 714 has a binary value of 00 (PCI read) or 01 (PCI write) indicating the transaction is destined for a PCI I/F 316, then the Transaction Switch 302 determines whether the transaction 700 is destined for the PCI-B I/F 316, in step 1242. Preferably, the Transaction Switch 302 determines whether the transaction 700 is destined for the PCI-B I/F 316 by determining whether the PCI address specified in the PCI Address/port field 704 is within one of a plurality of predetermined address ranges associated with PCI bus-B 216. Preferably, the predetermined address ranges are programmed by the CPU 208 via PCI configuration registers included in the hybrid channel adapter/switch 202.

If the transaction 700 is destined for the PCI I/F-B 316, then the Transaction Switch 302 modifies the transaction 700 to a PCI I/F 316 output queue 504 transaction 1000 and sends the modified transaction 1000 to a slot in the PCI I/F-B 316 output queue 504, in step 1244. Otherwise, the Transaction Switch 302 modifies the transaction 700 to a PCI I/F 316 output queue 504 transaction 1000 and sends the modified transaction 1000 to a slot in the PCI I/F-A 316 output queue 504, in step 1246.

Each data device 310 is responsible for ensuring that its input queue 502 is not overrun. The MACs 318 perform flow control on their InfiniBand links 132 to prevent their link partner from transmitting more packets than available input queue 502 slots. The PCI I/Fs 316 perform PCI retry cycles to the I/O controllers 206 initiating PCI cycles directed at the PCI I/F 316 if no input queue 502 slots are available. The Bus Router 314 stops processing packets until one of its input queue 502 slots becomes available.

In one embodiment, the number of slots, or entries, in an output queue 504 is equal to the total number of input queue 502 slots for all input queues 502 whose transactions may be destined for a given output queue 504. That is, an output queue 504 slot is always guaranteed to be available. Consequently, when the Transaction Switch 302 receives a transaction in an input queue 502, it may modify the transaction and send it to the destination device 310 output queue 504 without having to wait for a slot in the destination output queue 504 to become available.

For example, if the number of input queue 502 slots for each of the MAC 318 input queues 502 and the Bus Router 314 input queue 502 is 8, then the total number of transactions that could be destined for a MAC 318 output queue 504 is 32, i.e., (3 other MACs+1 Bus Router)*8=32. Thus, the number of MAC 318 output queue 504 slots is 32. Similarly, the number of Bus Router 314 output queue 504 slots is 32, i.e., 4 MACs*8=32. Preferably, the number of output queue 504 slots for each PCI I/F 316 is 16.

In another embodiment, the number of output queue 504 slots on a data device 310 is less than the total number of input queue 502 slots for all input queues 502 whose transactions may be destined for the output queue 504 of the device 310. Consequently, an input queue 502 transaction is buffered in the input queue 502 until a free slot in the output queue 504 of the destination data device 310 becomes available. As described above, the devices 310 insure that the input queue 502 slots are not overrun.

In one embodiment, the number of input queue 502 slots is equal to or less than the number of addressable buffers in the shared buffer memory 304. Consequently, a transaction posted in an input queue 502 need not be buffered in the input queue 502 due to shared data buffer unavailability. In an alternate embodiment, a transaction posted in an input queue 502 may require buffering in the input queue 502 until a shared data buffer becomes available. The transaction switch 302 provides a signal to the input queue 502 to indicate whether buffering resources are available in the shared buffer memory 304.

In one embodiment, the total number of input queue 502 slots for all of the MACs 318 is fixed, preferably at 32. A control register exists with the hybrid channel adapter/switch 202 that may be programmed, preferably by CPU 208, to designate how many of the 32 total input queue 502 slots are allocated to each of the MACs 318. Thus, if some of the MACs 318 are not being used, the CPU 208 may allocate more input queue 502 slots to the active MACs 318. Furthermore, if the MACs 318 have been combined to operate in a 4× InfiniBand data transfer rate mode, then the control register will be programmed to allocate all of the input queue 502 slots to a single MAC 318.

Figure 13A:
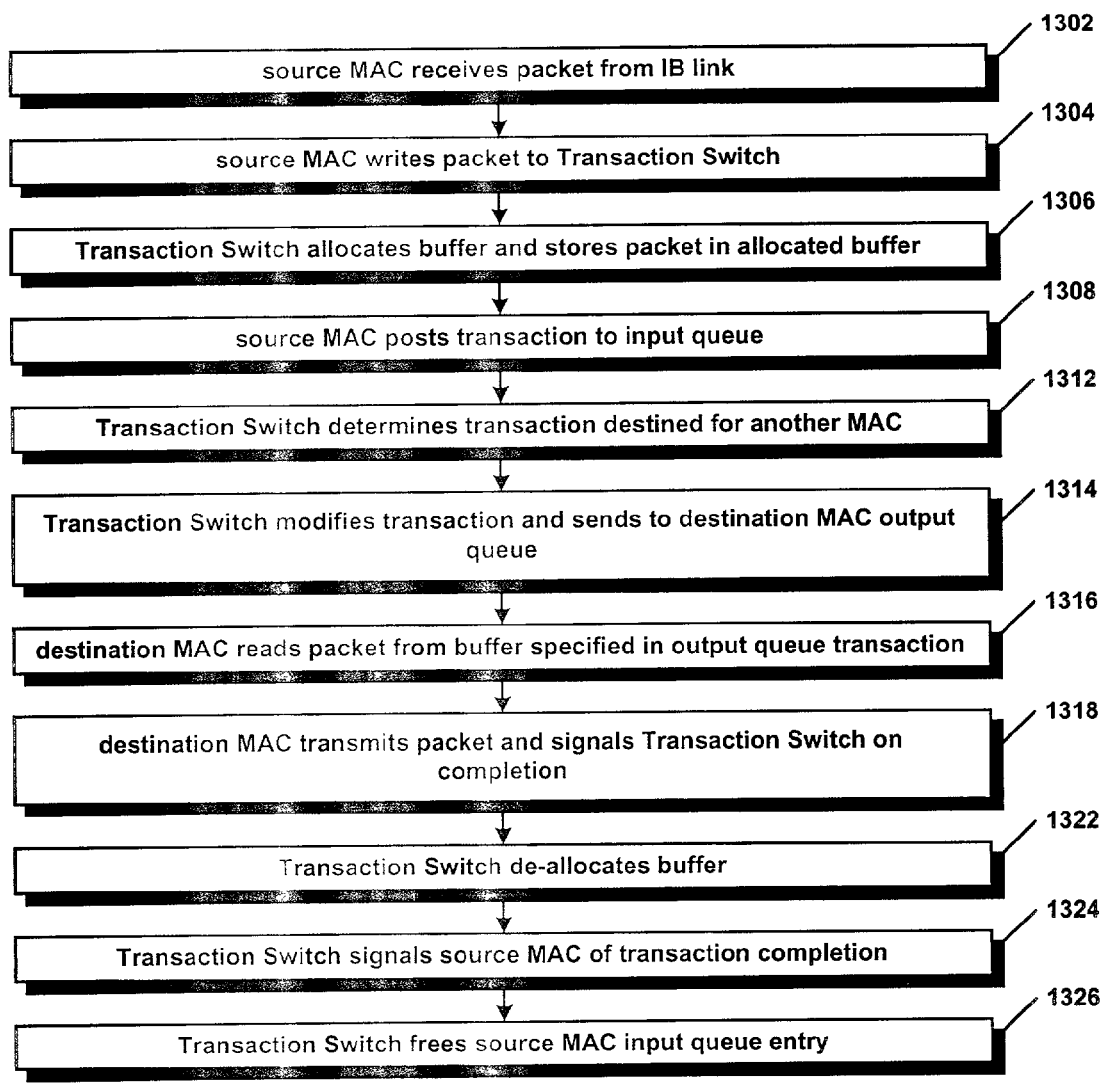
FIG. 13a is a flowchart illustrating an example of the Transaction Switch switching a packet between two of the MACs of FIG. 3.

Referring now to FIG. 13a, a flowchart illustrating an example of the Transaction Switch 302 switching a packet between two of the MACs 318 of FIG. 3 is shown. FIG. 13b is a flow diagram providing a visual illustration of some of the steps of FIG. 13a. As shown in FIG. 13b, the flow of data between the various functional blocks of the hybrid channel adapter/switch 202 of FIG. 3 is represented by dotted arrows and the flow of transactions is represented by the thick solid arrows. The various arrows indicating the flow of data and transactions are labeled to correspond to steps numbered in the flowchart of FIG. 13a.

One of the MACs 318, referred to as the source MAC 318, receives an InfiniBand packet from its InfiniBand link 132, in step 1302. The source MAC 318 begins to write the first word of data of the packet to the Transaction Switch 302 on its associated data path 340 using control signals 350, in step 1304. As the source MAC 318 writes the packet to the Transaction Switch 302, the source MAC 318 parses the packet to save needed information for generating a transaction. In response, the buffer manager 414 in the Transaction Switch 302 allocates a buffer from the shared buffer memory 304 and stores the packet data into the allocated buffer, in step 1306. That is, the MAC 318 performs a packetized data transfer into the allocated buffer.

The buffer manager 414 dynamically allocates buffers to the devices 310 from the shared buffer memory 304, preferably on a first-come-first-serve basis. This has the advantage of enabling the busiest devices 310 to efficiently utilize the shared buffer memory 304, as opposed to inefficiently utilizing buffer memory in a conventional scheme that statically allocates fixed amounts of memory to data devices.

When the source MAC 318 has parsed the packet and written the packet to the allocated buffer, the source MAC 318 generates and posts a transaction 600 of FIG. 6 to its input queue 502 using control signals 350, in step 1308. The Transaction Switch 302 determines the transaction 600 is destined for another MAC 318 based on a mapping table 412 lookup as in step 1208 of FIG. 12, in step 1312. In response, the Transaction Switch 302 modifies the transaction 600 to a MAC 318 output queue 504 transaction 800 and sends the modified transaction 800 to the destination MAC 318 output queue 504 as in step 1214 of FIG. 12, in step 1314. In particular, the Transaction Switch 302 copies the buffer address field 616 from the MAC 318 input queue 502 entry 600 to the buffer address field 812 of the MAC 318 output queue 504 entry 800 to enable the destination MAC 318 to retrieve the packet from the appropriate shared buffer memory 304 location.

The destination MAC 318 detects the modified transaction 800 and responsively reads the packet data on its associated data path 340 from the buffer specified in the modified transaction 800 which was previously allocated during step 1306, in step 1316. That is, the destination MAC 318 performs a packetized data transfer from the allocated buffer. The destination MAC 318 transmits the packet on its InfiniBand link 132 and signals the Transaction Switch 302 when the packet has been transmitted using control signals 350, in step 1318.

In response, the buffer manager 414 of the Transaction Switch 302 de-allocates the buffer previously allocated during step 1306, in step 1322. In addition, the Transaction Switch 302 signals the source MAC 318 that the transaction 600 has completed using control signals 350, in step 1324. The Transaction Switch 302 frees the slot in the source MAC 318 input queue 502, in step 1326.

In an alternate embodiment, the source MAC 318 posts a transaction 600 in the input queue 502 during step 1308 prior to writing the entire packet to the Transaction Switch 302 and steps 1312 through 1318 are performed substantially concurrently with the source MAC 318 writing the packet data to the shared buffer memory 304. In this cut-through operation embodiment, the Transaction Switch 302 potentially allocates a smaller amount of buffer space within the shared buffer memory 304 by dynamically allocating buffer space only as needed to the extent that the destination MAC 318 does not drain the incoming packet data as fast as the source MAC 318 writes the data. Preferably, the Transaction Switch 302 allocates relatively small buffers as they become needed to store the source MAC 318 data writes, and de-allocates the small buffers as soon as they are emptied by the destination MAC 318.

Figure 14A:
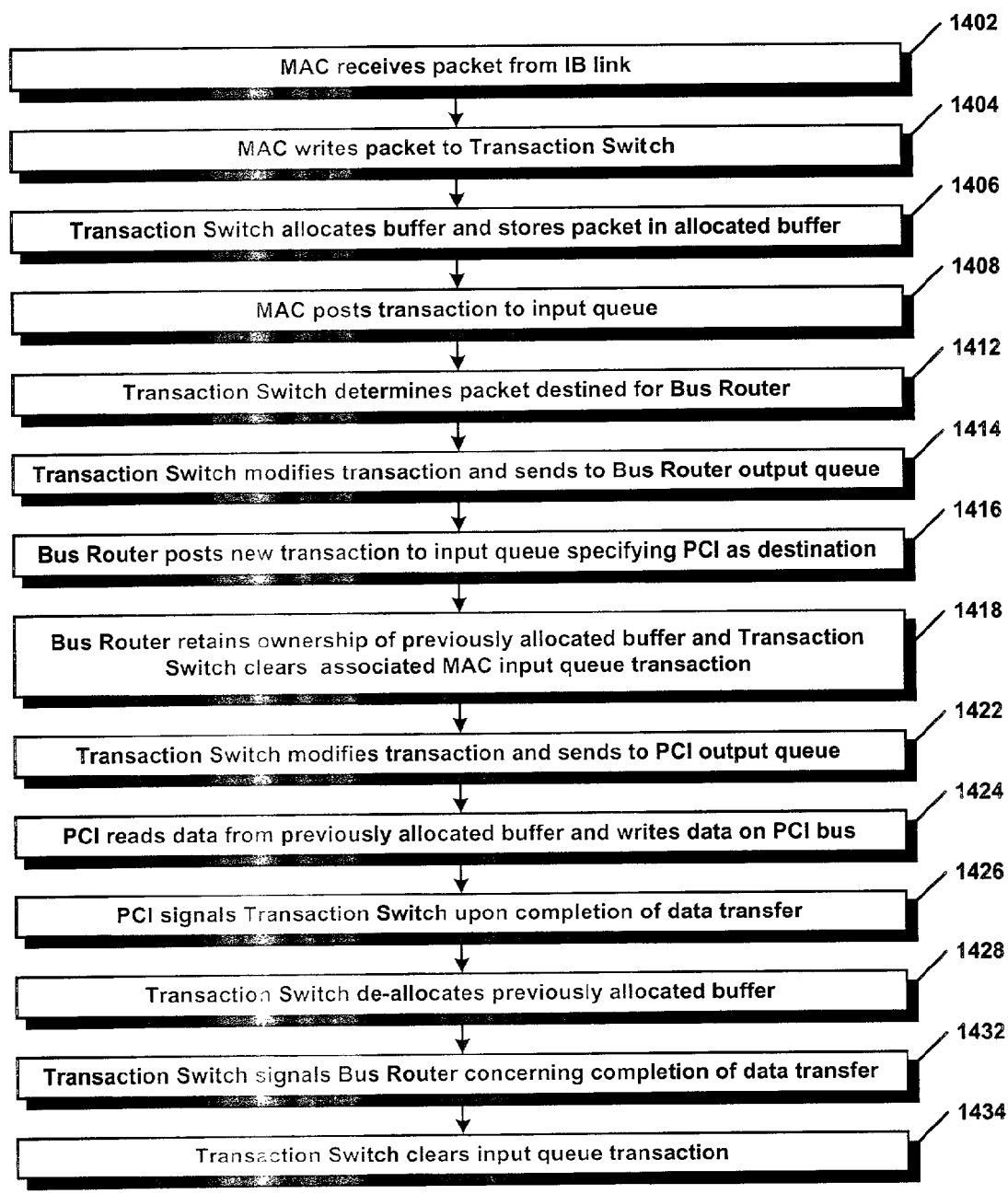
FIG. 14a, a flowchart illustrating operation of the Transaction Switch in switching a packetized data transaction to an addressed data transaction.
Figure 14B:
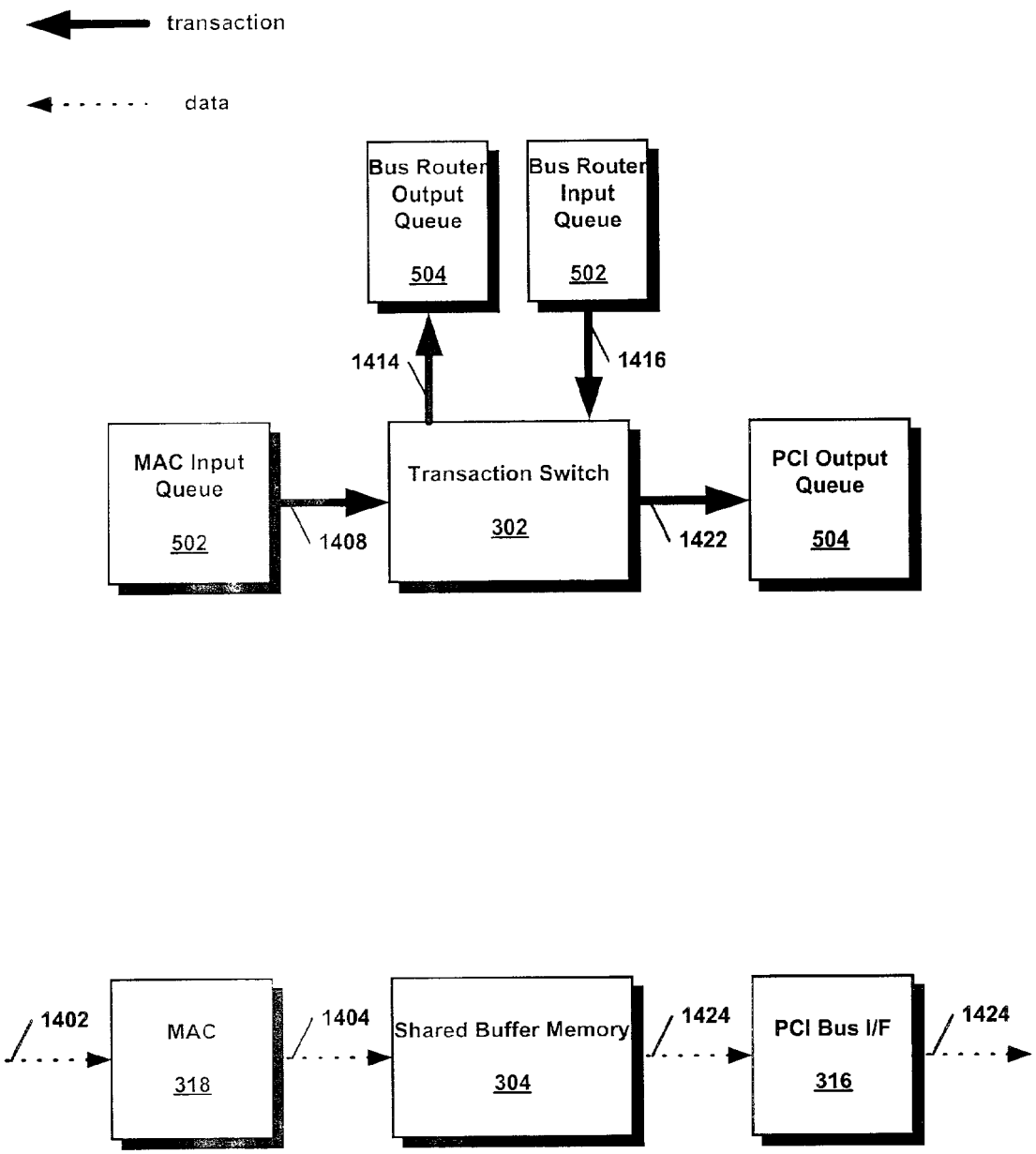

Referring now to FIG. 14a, a flowchart illustrating operation of the Transaction Switch 302 in switching a packetized data transaction to an addressed data transaction is shown. FIG. 14b is a flow diagram providing a visual illustration of some of the steps of FIG. 14a. As shown in FIG. 14b, the flow of data between the various functional blocks of the hybrid channel adapter/switch 202 of FIG. 3 is represented by dotted arrows and the flow of transactions is represented by the thick solid arrows. The various arrows indicating the flow of data and transactions are labeled to correspond to steps numbered in the flowchart of FIG. 14a.

Steps 1402 through 1408 of FIG. 14a are similar to Steps 1302 through 1308 of FIG. 13a. The Transaction Switch 302 determines the transaction 600 posted in the previous step is destined for the Bus Router 314 by performing a mapping table 412 lookup as in step 1208 of FIG. 12, in step 1412. The Transaction Switch 302 modifies the transaction 600 to a Bus Router 314 output queue 504 transaction 900 of FIG. 9 and sends the modified transaction 900 to the Bus Router 314 output queue 504 as in step 1206 of FIG. 12, in step 1414. The Transaction Switch 302 copies the buffer address field 616 from the MAC 318 input queue 502 entry 600 to the buffer address field 916 of the Bus Router 314 output queue 504 entry 900 to enable the Bus Router 314 to pass on the buffer address to the PCI I/F 316.

In response, the Bus Router 314 creates a new addressed data transaction 700 and posts the transaction 700 to its input queue 502, in step 1416. The transaction 700 is an addressed data transaction because the Bus Router 314 populates the Type field 714 with a binary value of 01 to indicate a "PCI write" operation. The Bus Router 314 specifies an addressed data address in the PCI Address/Port field 704 which will be used by the Transaction Switch 302 to determine which of the PCI I/Fs 316 is the destination of the addressed data transaction 700. The Bus Router 314 populates the transaction Tag field 702 with a unique identifier value to distinguish the transaction 700 from other transactions 700 already posted or to be posted in the future. The Bus Router 314 copies the buffer address field 916 from the Bus Router 314 output queue 504 entry 900 received during step 1414 to the buffer address field 716 of the Bus Router 314 input queue 502 entry 700 to enable the Transaction Switch 302 to pass the buffer address to the PCI I/F 316. Preferably, the Bus Router 314 creates the new transaction 700 based upon I/O operation information received from the CPU 208 of FIG. 2.

For example, the packet received during step 1402 may be an InfiniBand RDMA Read Response packet transmitted by another InfiniBand node to the hybrid channel adapter/switch 202 to provide data in response to an RDMA Read Request packet transmitted by the hybrid channel adapter/switch 202 to the other InfiniBand node. The packets may be part of a Direct RDMA operation, for example, as described in co-pending U.S. patent application entitled INIFINIBAND CHANNEL ADAPTER FOR PERFORMING DIRECT DMA BETWEEN PCI BUS AND INFINIBAND LINK incorporated by reference above. The Bus Router 314 examines the packet and determines the packet includes data destined for one of the I/O devices 112 of FIG. 1, such as a disk drive, coupled to one of the PCI I/O controllers 206 of FIG. 2. Thus, in one example, the PCI Address field 704 may specify an address mapped to one of the PCI I/O controllers 206. In another example, the PCI Address field 704 may specify an address in the local memory 218 of FIG. 2. In one embodiment, such as in a RAID controller in which data redundancy must be generated, the Bus Router 314 posts two addressed data transactions 700 to the Transaction Switch 302 for switching to the PCI I/F 316: one to transfer data to the local memory 218 and one to transfer data to an I/O controller 206.

The Transaction Switch 302 frees the source MAC 318 input queue 502 slot and the Bus Router 314 retains ownership of the buffer previously allocated during step 1406, in step 1418.

In response to the Bus Router 314 posting the transaction 700 during step 1416, the Transaction Switch 302 modifies the transaction 700 to a PCI I/F 316 output queue 504 transaction 1000 and sends the modified transaction 1000 to the appropriate PCI I/F 316 output queue 504 as in step 1244 or 1246 of FIG. 12 based on the determination made in step 1242, in step 1422. The Transaction Switch 302 copies the buffer address field 716 from the Bus Router 314 input queue 502 entry 700 to the buffer address field 1014 of the PCI I/F 316 output queue 504 entry 1000 to enable the PCI I/F 316 to retrieve the packet payload data from the appropriate shared buffer memory 304 location. The Transaction Switch 302 also copies the Bus Router 314 input queue 502 entry 700 transaction Tag field 702 to the PCI I/F 316 output queue 504 entry 1000 transaction Tag field 1002. The Transaction Switch 302 also copies the Bus Router 314 input queue 502 entry 700 PCI Address/port field 704 to the PCI I/F 316 output queue 504 entry 1000 PCI Address field 1004.

The PCI I/F 316 receives the modified transaction 1000, and responsively reads the data on its associated data path 340 from the buffer previously allocated during step 1406 and writes the data on its PCI bus 216, in step 1424. That is, the PCI I/F 316 performs an addressed data transfer from the allocated buffer. The PCI I/F 316 uses the information in the transaction 1000 to perform the data transfer. In particular, the PCI I/F 316 reads the amount of data specified in the length field 1006 from a location in the allocated buffer based on the buffer address 1014 and offset 1008 fields, and writes the data at the PCI address specified in the PCI Address field 1004 of the transaction 1000 Advantageously, the offset field 1008 of FIG. 10 enables the PCI I/F 316 to read and write, for example, only the data payload portion of the InfiniBand packet stored in the buffer in the shared buffer memory 304. By excluding or leaving room for the InfiniBand header, which may not be necessary to write to an I/O device 112, such as a disk drive, or is not available from the I/O device 112 in the case of a read, the offset field 1008 advantageously enables translation between packetized data protocols and addressed data protocols within the shared buffer memory 304.

The PCI I/F 316 signals the Transaction Switch 302 upon completion of the transfer of the specified data to the PCI bus 216, providing the transaction Tag value 1002 to the Transaction Switch 302 via control signals 350, in step 1426.

In response, the Transaction Switch 302 de-allocates the buffer previously allocated during step 1406, in step 1428. Additionally, the Transaction Switch 302 signals the Bus Router 314 that the PCI data transfer has completed, providing the transaction Tag value 1002 via control signals 350 received from the PCI I/F 316 during step 1426, in step 1432. Furthermore, the Transaction Switch 302 clears the associated Bus Router 314 input queue 502 transaction slot, in step 1434.

In an alternate embodiment, the MAC 318 posts a transaction 600 in the input queue 502 during step 1408 prior to writing the entire packet to the Transaction Switch 302 and steps 1412 through 1424 are performed substantially concurrently with the MAC 318 writing the packet data to the shared buffer memory 304. In this cut-through operation embodiment, the Transaction Switch 302 potentially allocates a smaller amount of buffer space within the shared buffer memory 304 by dynamically allocating buffer space only as needed to the extent that the PCI I/F 316 does not drain the incoming packet payload data as fast as the MAC 318 writes the data. Preferably, the Transaction Switch 302 allocates relatively small buffers as they become needed to store the MAC 318 data writes, and de-allocates the small buffers as soon as they are emptied by the PCI I/F 316.

Figure 15B:
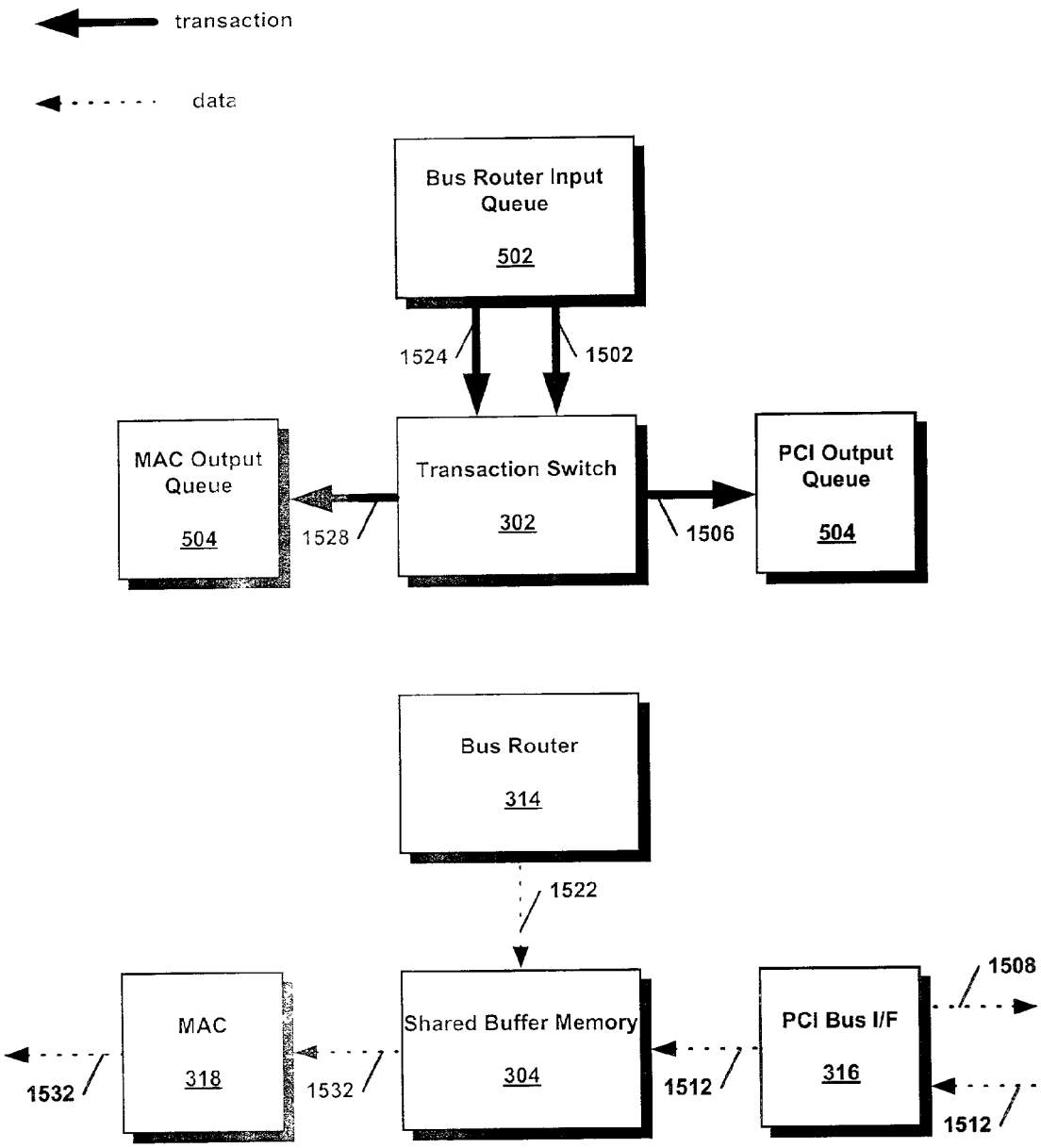

Referring now to FIG. 15a, a flowchart illustrating operation of the Transaction Switch 302 in switching an addressed data transaction to a packetized data transaction is shown. FIG. 15b is a flow diagram providing a visual illustration of some of the steps of FIG. 15a. As shown in FIG. 15b, the flow of data between the various functional blocks of the hybrid channel adapter/switch 202 of FIG. 3 is represented by dotted arrows and the flow of transactions is represented by the thick solid arrows. The various arrows indicating the flow of data and transactions are labeled to correspond to steps numbered in the flowchart of FIG. 15a.

The Bus Router 314 creates a Bus Router 314 input queue 502 transaction 700 specifying one of the PCI I/Fs 316 as the destination, and posts the transaction 700 to its input queue 502, in step 1502. The transaction 700 specifies a "PCI read" in the Type field 714. Hence, the transaction 700 posted by the Bus Router 314 during step 1502 is an addressed data transaction. The Bus Router 314 populates the transaction Tag 702 with a unique identifier in order to distinguish the transaction 700 from other outstanding transactions. Preferably, the Bus Router 314 creates the new transaction 700 based upon I/O operation information received from the CPU 208 of FIG. 2.

For example, the data specified in the PCI Address field 704 and length field 706 of the transaction 700 may be data from one of the I/O devices 112 for inclusion in an InfiniBand RDMA Write packet to be transmitted by the hybrid channel adapter/switch 202 to another InfiniBand node during step 1532 described below. The packet may be part of a Direct RDMA operation, for example, as described in co-pending U.S. patent application entitled INIFINIBAND CHANNEL ADAPTER FOR PERFORMING DIRECT DMA BETWEEN PCI BUS AND INFINIBAND LINK incorporated by reference above. For another example, the PCI Address field 1004 may specify an address in the local memory 218 of FIG. 2.

The Transaction Switch 302 receives the transaction 700 and responsively allocates a buffer from the shared buffer memory 304 for storing the forthcoming data from the PCI bus 216, in step 1504. Additionally, the Transaction Switch 302 modifies the transaction 700 into a PCI I/F 316 output queue 504 transaction 1000 and sends the modified transaction 1000 to the specified PCI I/F 316 output queue 504 as in step 1244 or 1246 of FIG. 12 based on the determination made in step 1242, in step 1506. The Transaction Switch 302 copies the buffer address field 716 from the Bus Router 314 input queue 502 entry 700 to the buffer address field 1014 of the PCI I/F 316 output queue 504 entry 1000 to enable the PCI I/F 316 to write the specified data into the appropriate shared buffer memory 304 location. The Transaction Switch 302 also copies the Bus Router 314 input queue 502 entry 700 transaction Tag 702 field to the PCI I/F 316 output queue 504 entry 1000 transaction Tag field 1002.

In response, the PCI I/F 316, acting as a PCI master, generates one or more PCI read commands on the PCI bus 216 according to the PCI Address field 1004 and length field 1006 of the transaction 1000, in step 1508. In another embodiment, the PCI I/F 316, acting as a PCI slave, receives data from a PCI write operation performed by one of the I/O controllers 206.

The PCI I/F 316 writes the data received from the PCI bus 216 on its associated data path 340 to the Transaction Switch 302 into the buffer previously allocated during step 1504, in step 1512. That is, the PCI I/F 316 performs an addressed data transfer into the allocated buffer. The PCI I/F 316 uses the information in the transaction 1000 to perform the data transfer. In particular, the PCI I/F 316 reads the amount of data specified in the length field 1006 from the PCI address specified in the PCI Address field 1004 of the transaction 1000, and writes the data to the buffer based on the buffer address 1014 and offset 1008 fields. Advantageously, the offset field 1008 enables the PCI I/F 316 to write, for example, the data received from the PCI bus 216 to a location in the allocated buffer so as to leave room for the Bus Router 314 to create an InfiniBand header in front of the data, as will be described with respect to step 1522 below.

The PCI I/F 316 signals the Transaction Switch 302 via control signals 350 when the data transfer has completed, providing the transaction Tag value 1002 to the Transaction Switch 302, in step 1514. In response, the Transaction Switch 302 signals the Bus Router 314 regarding the data transfer completion, providing the transaction Tag value 1002 via control signals 350 received from the PCI I/F 316 during step 1514, in step 1516.

Preferably, the Bus Router 314 may collect multiple sets of data from the PCI bus 216, such as from local memory 218 and/or I/O controllers 206, to assemble in the shared buffer memory 304 to create an InfiniBand packet payload for performing a packetized data transmission. Therefore, if the Bus Router 314 determines more data is required, in step 1518, then steps 1502 through 1516 are performed multiple times.

Once all the data has been transferred by the PCI I/F 316 to the allocated buffer, the Bus Router 314 writes an InfiniBand header into the buffer in front of the data stored in the buffer during step 1512 on one of its data paths 340 using control signals 350 in order to create an InfiniBand packet, in step 1522. For example, the Bus Router 314 may create an InfiniBand RDMA Write packet or RDMA Read Response packet.

Next, the Bus Router 314 creates a second transaction 700 specifying the appropriate MAC 318 as its destination, and posts the transaction 700 to its input queue 502, retaining ownership of the buffer previously allocated during step 1504, in step 1524. The Bus Router 314 copies the buffer address field 716 from the Bus Router 314 output queue 504 entry 700 allocated by the Transaction Switch 302 during step 1504, i.e., of the first transaction 700, to the buffer address field 716 of the second Bus Router 314 input queue 502 entry 700 generated during step 1524 to enable the Transaction Switch 302 to pass the buffer address to the destination MAC 318. The Bus Router 314 populates the transaction Tag 702 with a unique identifier in order to distinguish the transaction 700 from other outstanding transactions.

The transaction 700 posted during step 1524 is a packetized data transaction because the Bus Router 314 populates the Type field 714 with a binary value of 10 to indicate an "InfiniBand write" operation. It is noted that transactions 700 posted by the Bus Router 314 in its input queue 502 may advantageously be either addressed data transactions, as used in step 1502, or packetized data transactions, as used in step 1524, depending upon the value the Bus Router 314 writes in the Type field 714. Thus, the Bus Router 314 is both a packetized and an addressed data device.

The Transaction Switch 302 clears the input queue 502 slot used during step 1502, in step 1526. In response to step 1524, the Transaction Switch 302 modifies the transaction 700 to a MAC 318 output queue 504 transaction 800 and sends the modified transaction 800 to the output queue 504 of the MAC 318 specified in the PCI Address/Port field 704 of the transaction 700 received from the Bus Router 314 as in step 1234 of FIG. 12, in step 1528. The Transaction Switch 302 copies the buffer address field 716 from the Bus Router 314 input queue 502 entry 700 to the buffer address field 812 of the MAC 318 output queue 504 entry 800 to enable the destination MAC 318 to retrieve the packet from the appropriate shared buffer memory 304 location. The Transaction Switch 302 also copies the Bus Router 314 input queue 502 entry 700 transaction Tag field 702 to the MAC 318 output queue 504 entry 800 transaction Tag field 804.

The destination MAC 318 detects the modified MAC 318 output queue 504 entry 800 and responsively reads on its associated data path 340 the packet created during step 1522 in the previously allocated buffer and transmits the packet on its InfiniBand link 132, in step 1532. The MAC 318 signals the Transaction Switch 302 that the packet has been transmitted, providing the transaction Tag value 804 to the Transaction Switch 302 via control signals 350, in step 1534.

In response, the Transaction Switch 302 de-allocates the buffer previously allocated during step 1504, in step 1536. Additionally, the Transaction Switch 302 signals the Bus Router 314 of completion of the packet transmission, providing the transaction Tag value 804 via control signals 350 received from the MAC 318 during step 1534, in step 1538. Finally, the Transaction Switch 302 clears the associated Bus Router 314 input queue 502 slot, in step 1542.

In an alternate embodiment, the PCI I/F 316 signals the Transaction Switch 302 as soon as it begins to write data to the allocated buffer during step 1512, i.e., prior to writing the entire amount of addressed data to the Transaction Switch 302. In this embodiment, steps 1514 through 1532 are performed substantially concurrently with the PCI I/F 316 writing the addressed data to the shared buffer memory 304. In this cut-through operation embodiment, the Transaction Switch 302 potentially allocates a smaller amount of buffer space within the shared buffer memory 304 by dynamically allocating buffer space only as needed to the extent that the destination MAC 318 does not drain the incoming packet data as fast as the PCI I/F 316 writes the data. Preferably, the Transaction Switch 302 allocates relatively small buffers as they become needed to store the PCI I/F 316 writes, and de-allocates the small buffers as soon as they are emptied by the destination MAC 318.

Figure 16:
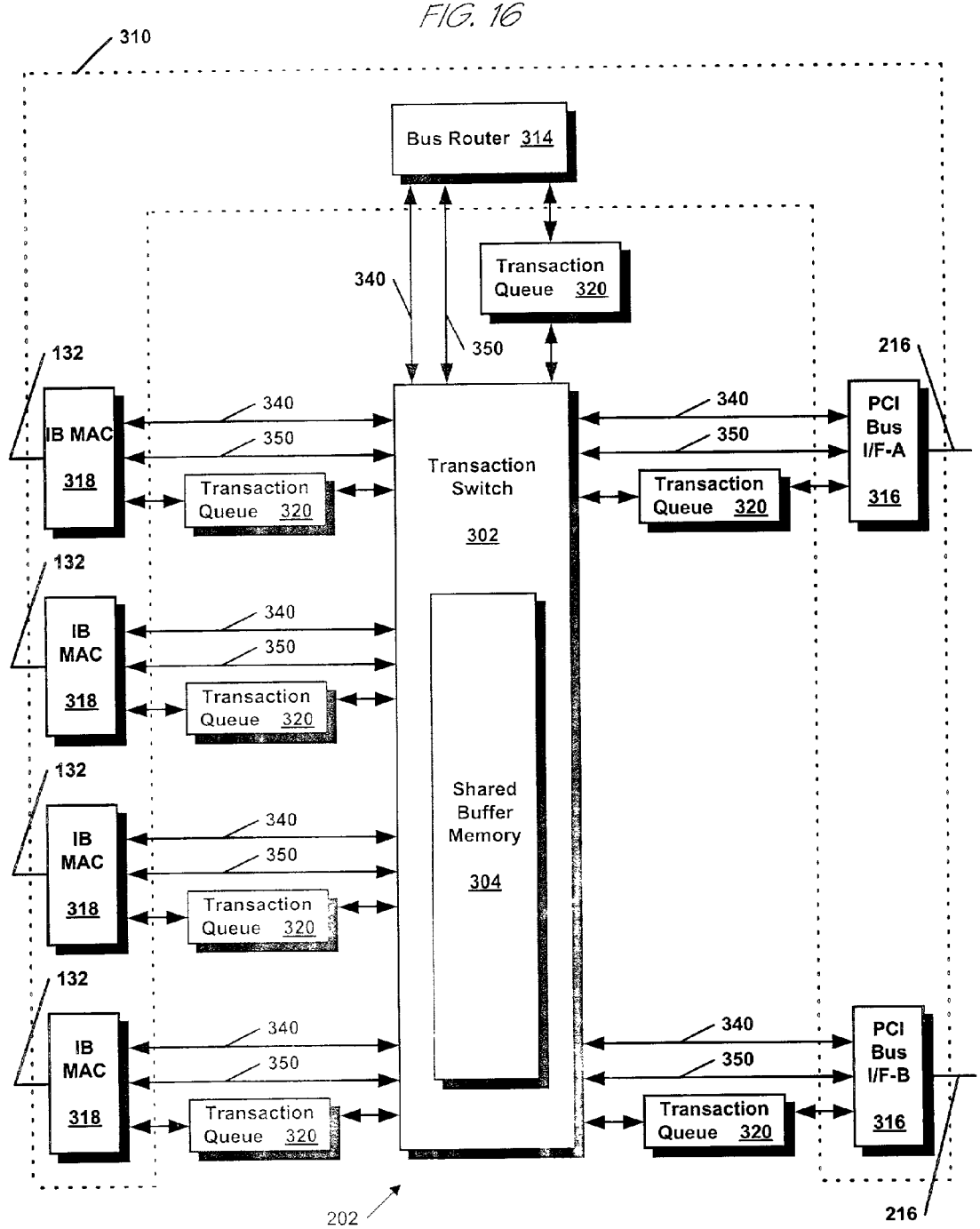
FIG. 16, a block diagram illustrating an alternate embodiment of the hybrid channel adapter/switch of FIG. 3.

Referring now to FIG. 16, a block diagram illustrating an alternate embodiment of the hybrid channel adapter/switch 202 of FIG. 3 is shown. The hybrid channel adapter/switch 202 of FIG. 16 is similar to the hybrid channel adapter/switch 202 of FIG. 3, except that the PCI-to-PCI bridge 332 of FIG. 3 is absent. Consequently, bridging or switching of addressed data between the PCI I/Fs 316 is performed through the Transaction Switch 302 rather than through the PCI-to-PCI bridge 332. Additionally, in the embodiment of FIG. 16, the transaction queues 320 associated with the PCI I/Fs 316 include input queues 502 for posting transactions to the Transaction Switch 302.

Figure 17:
FIG. 17 is a block diagram of the format of a transaction posted by a PCI I/F in an entry of a PCI I/F input queue.

Referring now to FIG. 17, a block diagram of the format of a transaction 1700 posted by a PCI I/F 316 in an entry, or slot, of a PCI I/F 316 input queue 502 is shown. The PCI I/F 316 input queue 502 transaction 1700 includes the following fields: a PCI Address field 1702, a length field 1704, a shared buffer memory 304 buffer address field 1706, and a PCI cycle type field 1708. When a PCI I/F 316 receives addressed data, the PCI I/F 316 generates a transaction 1700 and posts to its input queue 502 as described in step 1808 of FIG. 18a.

Figure 18A:
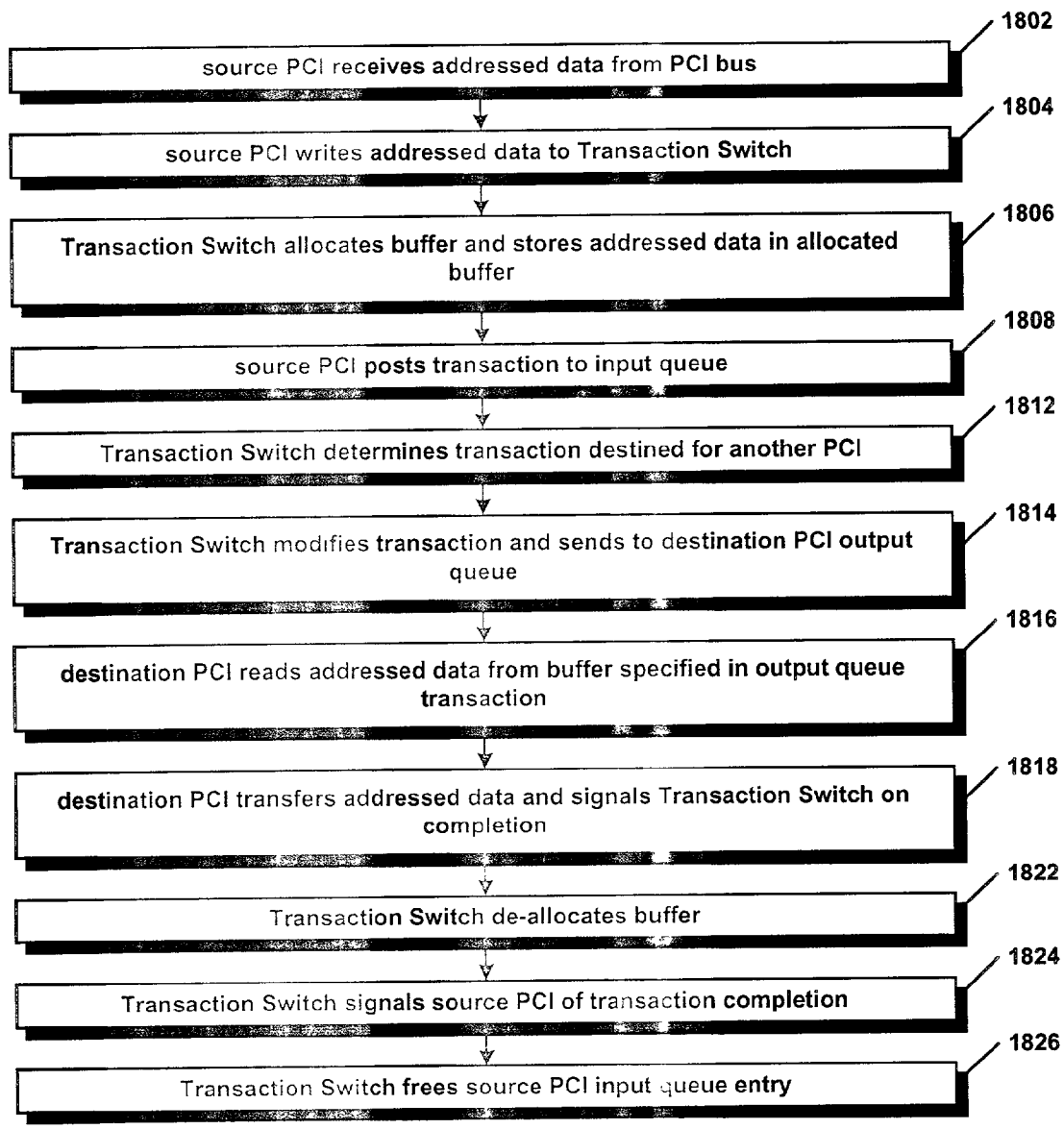
FIG. 18a is a flowchart illustrating an example of the Transaction Switch switching addressed data between the two PCI I/Fs of the hybrid channel adapter/switch of FIG. 16.

Referring now to FIG. 18a, a flowchart illustrating an example of the Transaction Switch 302 switching addressed data between the two PCI I/Fs 316 of the hybrid channel adapter/switch 202 of FIG. 16 is shown. FIG. 18b is a flow diagram providing a visual illustration of some of the steps of FIG. 18a. As shown in FIG. 18b, the flow of data between the various functional blocks of the hybrid channel adapter/switch 202 of FIG. 3 is represented by dotted arrows and the flow of transactions is represented by the thick solid arrows. The various arrows indicating the flow of data and transactions are labeled to correspond to steps numbered in the flowchart of FIG. 18a.

One of the PCI I/Fs 316, referred to as the source PCI I/F 316, receives addressed data from its PCI bus 216, in step 1802. For example, the addressed data is received because one of the I/O controllers 206 performs PCI master write cycles with the PCI I/F 316 as the target of the cycles. The source PCI I/F 316 begins to write the first word of the addressed data to the Transaction Switch 302 on its associated data path 340 using control signals 350, in step 1804. As the source PCI I/F 316 writes the addressed data to the Transaction Switch 302, the source PCI I/F 316 maintains the PCI address and number of bytes transferred for subsequent generation of an addressed data transaction 1700. In response, the buffer manager 414 in the Transaction Switch 302 allocates a buffer from the shared buffer memory 304 and stores the addressed data into the allocated buffer, in step 1806. That is, the PCI I/F 316 performs an addressed data transfer into the allocated buffer.

The buffer manager 414 dynamically allocates buffers to the devices 310 from the shared buffer memory 304, preferably on a first-come-first-serve basis. This has the advantage of enabling the busiest devices 310 to efficiently utilize the shared buffer memory 304, as opposed to inefficiently utilizing buffer memory in a conventional scheme that statically allocates fixed amounts of memory to data devices.

When the source PCI I/F 316 has written the addressed data to the allocated buffer, the source PCI I/F 316 generates and posts an addressed data transaction 1700 of FIG. 17 to its input queue 502 using control signals 350, in step 1808. The PCI I/F 316 populates the PCI Address field 1702 with the PCI address of the addressed data received and populates the Length field 1704 with the total number of bytes received from the PCI bus 216 in the data transfer. The buffer address field 1706 is populated by the Transaction Switch 302 based on the buffer allocation performed during step 1806. The PCI I/F 316 populates the PCI cycle type field 1708 with a value to indicate a PCI write cycle direction, i.e., from the PCI bus 216 to the source PCI I/F 316.

In one embodiment, the PCI cycle type field 1708 comprises four bits to indicate not only the direction of the addressed data transfer, but also to indicate the type of cycle among the various PCI cycle types.

The Transaction Switch 302 determines the transaction 1700 is destined for the other PCI I/F 316, preferably based upon which of a plurality of address ranges the PCI Address field 1702 is in, in step 1812. Preferably, the PCI address ranges corresponding to each of the PCI I/Fs 316 is programmed by the CPU 208. In response, the Transaction Switch 302 modifies the transaction 1700 to a PCI I/F 316 output queue 504 transaction 1000 and sends the modified transaction 1000 to the destination PCI I/F 316 output queue 504, in step 1814. In particular, the Transaction Switch 302 copies the buffer address field 1706 from the PCI I/F 316 input queue 502 entry 1700 to the buffer address field 1014 of the PCI I/F 316 output queue 504 entry 1000 to enable the destination PCI I/F 316 to retrieve the addressed data from the appropriate shared buffer memory 304 location.

The destination PCI I/F 316 detects the modified transaction 1000 and responsively reads the addressed data on its associated data path 340 from the buffer specified in the modified transaction 1000 which was previously allocated during step 1806, in step 1816. That is, the destination PCI I/F 316 performs an addressed data transfer from the allocated buffer. The destination PCI I/F 316 transfers the addressed data on its PCI bus 216 and signals the Transaction Switch 302 when the addressed data has been transferred using control signals 350, in step 1818.

In response, the buffer manager 414 of the Transaction Switch 302 de-allocates the buffer previously allocated during step 1806, in step 1822. In addition, the Transaction Switch 302 signals the source PCI I/F 316 that the transaction 1700 has completed using control signals 350, in step 1824. The Transaction Switch 302 frees the slot in the source PCI I/F 316 input queue 502, in step 1826.

In an alternate embodiment, the source PCI I/F 316 posts a transaction 1700 in the input queue 502 during step 1808 prior to writing the entire addressed data to the Transaction Switch 302 and steps 1812 through 1818 are performed substantially concurrently with the source PCI I/F 316 writing the addressed data to the shared buffer memory 304. In this cut-through operation embodiment, the Transaction Switch 302 potentially allocates a smaller amount of buffer space within the shared buffer memory 304 by dynamically allocating buffer space only as needed to the extent that the destination PCI I/F 316 does not drain the incoming addressed data as fast as the source PCI I/F 316 writes the data. Preferably, the Transaction Switch 302 allocates relatively small buffers as they become needed to store the source PCI I/F 316 data writes, and de-allocates the small buffers as soon as they are emptied by the destination PCI I/F 316.

Although the present invention and its objects, features, and advantages have been described in detail, other embodiments are encompassed by the invention. For example, the present invention is adaptable to various addressed data interfaces or buses and is not limited to a PCI bus. For example, a Rapid I/O bus, VESA bus, ISA bus, LDT bus, SDRAM bus, DDR SDRAM bus, RAMBUS or the like, may be employed in place of or in addition to a PCI bus. For example, the present invention is adaptable to various packetized data interfaces and is not limited to an InfiniBand interface. For example, an Ethernet, FibreChannel, IEEE 1394, SONET, ATM, SCSI, serial ATA, OC-48, OC-192 interface or the like may be employed in place of or in addition to the InfiniBand interface. In addition, the invention is not limited to a single type of addressed data interface or single packetized data interface. The present invention is readily adaptable to a plurality of different types of addressed data interfaces and/or a plurality of different types of packetized data interfaces all coupled to the transaction switch. Furthermore, one skilled in the art may readily adapt from the present disclosure the input queue and output queue transaction formats to accommodate various other addressed data and packetized data interfaces other than PCI and InfiniBand.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An integrated circuit functioning as a network interface adapter, comprising:
   a plurality of media access controllers (MACs), for transceiving packets;
   a local bus interface, for performing addressed data transfers on a local bus coupled thereto;
   a bus router, for performing transport layer operations between said plurality of MACs and said local bus interface;
   a memory, shared by said plurality of MACs, said local bus interface, and said bus router, for buffering data received thereby; and
   a transaction switch, coupled to said memory, said plurality of MACs, said local bus interface, and said bus router, for switching data and transactions therebetween;
   wherein said bus router is configured to write a packet header into said memory via said transaction switch along with addressed data stored in said memory by said local bus interface to create a packet;
   wherein said local bus interface is configured to read a payload portion of a packet stored in said memory and to transmit said payload portion on said local bus coupled thereto;
   wherein said payload portion is located in said memory at an offset specified in a transaction posted by said bus router to said local bus interface via said transaction switch.

2. The integrated circuit of claim 1, further comprising:
   a plurality of transaction queues, associated with said plurality of MACs, said local bus interface, and said bus router, coupled to said transaction switch, for storing said transactions.

3. The integrated circuit of claim 1, wherein said memory comprises a random access memory.

4. The integrated circuit of claim 1, wherein said transaction switch comprises:
   a buffer manager, for allocating portions of said memory to said plurality of MACs, said local bus interface, and said bus router, for buffering said data received thereby.

5. The integrated circuit of claim 4, wherein said buffer manager performs said allocating in an as-needed manner.

6. The integrated circuit of claim 1, wherein said local bus interface comprises a PCI interface.

7. The integrated circuit of claim 1, wherein said transaction switch is configured to receive a transaction posted by a first of said plurality of MACs in response to a packet received by said first of said plurality of MACs and to selectively switch said transaction to one of a second of said plurality of MACs and said bus router.

8. The integrated circuit of claim 7, wherein said transaction switch selectively switches said transaction based on an InfiniBand destination local identification value included in said transaction.

9. The integrated circuit of claim 8, wherein said transaction switch selectively switches said transaction to said bus router if an entry associated with said InfiniBand destination local identification value in a mapping table of said transaction switch indicates said transaction is destined for said bus router.

10. The integrated circuit of claim 9, wherein said transaction switch selectively switches said transaction to one of said plurality of MACs based on which of said plurality of MACs is associated with said InfiniBand destination local identification value in said mapping table if said entry indicates said transaction is not destined for said bus router.

11. The integrated circuit of claim 8, wherein said first MAC parses said InfiniBand destination local identification value from said packet.

12. The integrated circuit of claim 7, wherein said transaction includes an InfiniBand virtual lane number parsed from said packet.

13. The integrated circuit of claim 7, wherein said transaction includes a destination queue pair number parsed from said packet.

14. The integrated circuit of claim 1, wherein said transaction switch is configured to receive a transaction posted by said bus router and to selectively switch said transaction to one of said plurality of MACs and said local bus interface.

15. The integrated circuit of claim 14, wherein said transaction switch selectively switches said transaction based on a transaction type value included in said transaction.

16. The integrated circuit of claim 15, further comprising:
   a second local bus interface, for performing addressed data transfers on a second local bus coupled thereto;
   wherein said transaction switch selectively switches said transaction to one of said first and second local bus interfaces based on whether a local bus address included in said transaction falls into one or more predetermined address ranges of said first and second local buses.

17. The integrated circuit of claim 14, wherein said transaction includes an address in an address range of said local bus.

18. The integrated circuit of claim 1, further comprising:
a second local bus interface, coupled to said transaction switch, for performing addressed data transfers on a second local bus coupled thereto; and
a local bus bridge coupled between said first and second local bus interfaces for buffering data therebetween.

19. The integrated circuit of claim 1, further comprising:
a second local bus interface;
wherein said transaction switch is configured to receive a transaction posted by said first local bus interface in response to an addressed data transfer received by said first local bus interface and to switch said transaction to said second local bus interface.

20. A transaction switch for switching data between a plurality of data devices, comprising:
a memory, shared by the plurality of data devices for buffering data received thereby;
multiplexing logic, coupled to said memory, for controlling the transfer of data between the plurality of data devices and said memory; and
control logic, coupled to said multiplexing logic, for controlling said multiplexing logic;
wherein the plurality of data devices comprise a plurality of packetized data devices and a plurality of addressed data devices;
wherein said control logic is configured to selectively control said multiplexing logic to transfer data through said memory between two of said packetized data devices and between one of said packetized data devices and one of said addressed data devices;
wherein said control logic is configured to selectively control said multiplexing logic to transfer data through said memory between two of said packetized data devices and between one of said packetized data devices and one of said addressed data devices in response to a transaction posted to the transaction switch by the plurality of data devices;
wherein said transaction comprises a command to transfer data between said memory and one of the plurality of data devices;
wherein said transaction comprises an address of a buffer within said memory, wherein said data to be transferred in response to said command is stored in said memory.

21. The transaction switch of claim 20, wherein said control logic is further configured to selectively control said multiplexing logic to transfer data through said memory between two of said addressed data devices.

22. The transaction switch of claim 20, wherein said control logic is configured to selectively control said multiplexing logic to transfer data through said memory between two of said packetized data devices and between one of said packetized data devices and one of said addressed data devices concurrently.

23. The transaction switch of claim 20, wherein at least two of said packetized data devices comprise InfiniBand interfaces.

24. The transaction switch of claim 20, wherein at least two of said addressed data devices comprise PCI interfaces.

25. The transaction switch of claim 20, further comprising:
a buffer manager, for allocating portions of said memory to the plurality of data devices for buffering said data.

26. The transaction switch of claim 25, wherein said buffer manager is configured to perform said allocating on substantially a first-come-first-serve basis.

27. The transaction switch of claim 20, wherein said transaction comprises an offset within said buffer for addressing portions of said data.

28. The transaction switch of claim 20, wherein said transaction comprises a tag for uniquely identifying said transaction from other transactions posted to the transaction switch by the plurality of data devices.

29. The transaction switch of claim 20, wherein the plurality of data devices comprise a transport layer device, wherein the transaction switch is configured to receive transactions from said transport layer device for performing protocol translation of data between said one of said packetized data devices and said one of said addressed data devices.

30. A transaction switch for switching transactions and data between a plurality of data interfaces, the transaction switch comprising:
a memory, shared by the plurality of data interfaces, for buffering data received thereby;
a plurality of transaction queues, associated with each of the plurality of data interfaces, configured to store transactions, said transactions adapted to convey information to enable the plurality of data interfaces to transfer said data according to a plurality of disparate data transfer protocols supported thereby; and
control logic, coupled to said memory and said plurality of transaction queues, configured to route said data through said shared memory between the plurality of data interfaces and to switch said transactions between the plurality of data interfaces;
wherein at least one of the plurality of data interfaces comprises a bus router for performing a transport layer function between at least two of the plurality of data interfaces which support disparate data protocols;
wherein at least one of the plurality of data interfaces comprises a local bus interface for interfacing to a local bus, wherein at least one of the plurality of data interfaces comprises a MAC for interfacing to a network, wherein said bus router is configured to perform said transport layer function by writing packet header information into an allocated portion of said memory in front of data written into said allocated portion of said memory by said local bus interface;
wherein said bus router is configured to write said packet header information into said allocated portion of said memory before said MAC reads said packet from said allocated portion of said memory for writing to said network, without copying said data to another memory.

31. The transaction switch of claim 30, wherein said control logic is configured to route said data between the plurality of data interfaces through said shared memory in response to said transactions received from said plurality of transaction queues.

32. The transaction switch of claim 30, wherein at least a portion of said plurality of transaction queues is configured to store transactions adapted to convey information necessary to transfer data according to an InfiniBand protocol.

33. The transaction switch of claim 30, wherein at least a portion of said plurality of transaction queues is configured to store transactions adapted to convey information necessary to transfer data according to an PCI protocol.

34. The transaction switch of claim 30, wherein said control logic is further configured to modify a transaction received from one of said plurality of transaction queues associated with a first of the plurality of data devices and to send said modified transaction to another one of said plurality of transaction queues.

35. An integrated circuit, comprising:
  at least three data interfaces;
  a memory, shared by said at least three data interfaces for buffering data therebetween; and
  a transaction switch, coupled to said at least three data interfaces and said memory, for dynamically allocating portions of said memory to said at least three data interfaces for storing data therein, and for controlling access to said allocated portions of said memory by each of said at least three data interfaces;
  wherein at least one of said at least three data interfaces is of a different type than the others;
  wherein at least one of said at least three data interfaces comprises a bus router for performing a transport layer function between at least two other of said at least three data interfaces which support disparate data protocols;
  wherein at least one of said at least three data interfaces comprises a local bus interface for interfacing to a local bus, wherein at least one of said at least three data interfaces comprises a MAC for interfacing to a network, wherein said bus router is configured to perform said transport layer function by writing packet header information into said allocated portions of said memory in front of data written into said allocated portions of said memory by said local bus interface;
  wherein said bus router is configured to write said packet header information into said allocated portions of said memory before said MAC reads said packet from said allocated portion of said memory for writing to said network, without copying said data to another memory.

36. The integrated circuit of claim 35, wherein at least one of said at least three data interfaces is a packetized data interface and at least one of said at least three data interfaces is an addressed data interface.

37. The integrated circuit of claim 36, wherein said at least one packetized data interface is an InfiniBand interface.

38. The integrated circuit of claim 36, wherein said at least one addressed data interface is a PCI interface.

39. The integrated circuit of claim 35, wherein said transaction switch is configured to receive a transaction from a first of said at least three data interfaces and to selectively switch said transaction to one of another of said at least three data interfaces.

40. The integrated circuit of claim 39, wherein said transaction is a packetized data transaction including packet destination information.

41. The integrated circuit of claim 40, wherein said transaction switch is configured to selectively switch said packetized data transaction to said another of said at least three data interfaces based on said packet destination information and information stored in a mapping table of said transaction switch.

42. The integrated circuit of claim 41, wherein said transaction switch is configured to selectively switch said packetized data transaction to said another of said at least three data interfaces further based on information stored in a table mapping said packet destination information to said at least three data interfaces.

43. The integrated circuit of claim 39, wherein in a first instance of said transaction said first and one of another of said at least three data interfaces are of a same type of interface, wherein in a second instance of said transaction said first and one of another of said at least three data interfaces are of a different type of interface.

44. The integrated circuit of claim 43, wherein in said first instance each of said first and one of another of said at least three data interfaces is a packetized data interface type.

45. The integrated circuit of claim 43, wherein in said second instance said first of said at least three data interfaces is a packetized data interface type and said one of another of said at least three data interfaces is an interface type capable of translating between packetized and addressed data.

46. The integrated circuit of claim 43, wherein in said second instance said first of said at least three data interfaces is a packetized data interface type and said one of another of said at least three data interfaces is a transport level data interface.

47. The integrated circuit of claim 39, wherein said transaction switch is configured to modify said transaction received from said first of said at least three data interfaces prior to selectively switching said received transaction to said one of another of said at least three data interfaces.

48. The integrated circuit of claim 35, wherein said transaction switch is configured to receive a transaction from a first of said at least three data interfaces and to selectively switch said received transaction to two or more of another of said at least three data interfaces.

49. The integrated circuit of claim 35, further comprising:
  a plurality of transaction queues, coupled between said transaction switch and said at least three data interfaces, for storing transactions between said transaction switch and said at least three data interfaces.

50. The integrated circuit of claim 49, further comprising a programmable register for specifying for at least a plurality of said plurality of transaction queues a number of transaction slots to be allocated for storing said transactions.

51. The integrated circuit of claim 35, wherein a first of said at least three data interfaces is configured to post a transaction to said transaction switch for instructing a second of said at least three data interfaces to transfer data to or from an offset in one of said allocated portions of said memory associated with a payload portion of a data packet.

52. The integrated circuit of claim 35, wherein said transaction switch is further configured to de-allocate said portions of said memory.

53. The integrated circuit of claim 35, wherein said transaction switch is configured to dynamically allocate said portions of said memory to said at least three data interfaces on a substantially as needed basis.

54. A network interface adapter, comprising:
  a plurality of network ports, for interfacing to a network;
  at least one addressed data bus interface;
  a memory, for buffering data received by said plurality of network ports and said at least one addressed data bus interface;
  a transport layer engine for performing a transport layer function for routing said data between said plurality of network ports and said at least one addressed data bus interface;
  a plurality of transaction queues, associated with each of said plurality of network ports, said at least one addressed data bus interface and said transport layer engine, for storing transactions; and
  a transaction switch, coupled to said plurality of transaction queues, configured to route said transactions between said plurality of network ports, said at least one addressed data bus interface and said transport layer engine;
  wherein said transport layer engine is configured to perform said transport layer function by writing packet header information into an allocated portion of said memory in front of data written into said allocated portion of said memory by said at least one addressed data bus interface;

wherein said transport layer engine is configured to write said packet header information into said allocated portion of said memory before one of said plurality of network ports reads said packet from said allocated portion of said memory for writing to said network, without copying said data to another memory.

55. The network interface adapter of claim 54, wherein at least a subset of said plurality of transaction queues comprise an input queue for said plurality of network ports to post said transaction to said switch.

56. The network interface adapter of claim 54, wherein said plurality of transaction queues comprise an output queue for said transaction switch to send said transaction to said plurality of network ports and said at least one addressed data bus interface.

57. The network interface adapter of claim 54, wherein said at least one addressed data bus interface is coupled to a data bus selected from a list comprising a Rapid I/O bus, a VESA bus, an ISA bus, a PCI bus, an LDT bus, an SDRAM bus, a DDR SDRAM bus, and a RAMBUS.

58. A transaction switch in a network device having a buffer memory and plurality of data devices, including packetized and addressed data devices, the transaction switch comprising:
- a buffer manager, for allocating portions of the buffer memory to the plurality of data devices on an as-needed basis;
- a plurality of data paths, coupling the buffer memory and the plurality of packetized and addressed data devices, for providing the plurality of data devices access to the buffer memory;
- a mapping table, for storing packet destination identification information;
- a plurality of transaction queues, for transferring transactions between the transaction switch and the plurality of data devices; and
- control logic, coupled to said mapping table and said plurality of transaction queues, for selectively switching transactions between the plurality of data devices based on said mapping table information and based on contents of said transactions;
- wherein at least one of the plurality of data devices comprises a bus router for performing a transport layer function between at least two of the plurality of data devices which support disparate data protocols;
- wherein at least one of the plurality of data devices comprises a local bus interface for interfacing to a local bus, wherein at least one of the plurality of data devices comprises a MAC for interfacing to a network, wherein said bus router is configured to perform said transport layer function by writing packet header information into said allocated portions of the buffer memory in front of data written into said allocated portions of the buffer memory by said local bus interface;
- wherein said bus router is configured to write said packet header information into said allocated portions of the buffer memory before said MAC reads said packet from said allocated portion of the buffer memory for writing to said network, without copying said data to another memory.

59. The transaction switch of claim 20, wherein a single integrated circuit comprises the transaction switch.

60. The transaction switch of claim 30, wherein a single integrated circuit comprises the transaction switch.

61. The network interface adapter of claim 54, wherein a single integrated circuit comprises the InfiniBand hybrid channel adapter/switch.

62. The integrated circuit of claim 1, wherein at least one of said plurality of MACs comprises an INFINIBAND MAC.

63. The integrated circuit of claim 1, wherein at least one of said plurality of MACs comprises an Ethernet MAC.

64. The transaction switch of claim 20, wherein at least one of said at least two of said packetized data devices comprises an Ethernet interface.

65. The transaction switch of claim 30, wherein at least a portion of said plurality of transaction queues is configured to store transactions adapted to convey information necessary to transfer data according to an Ethernet protocol.

66. The integrated circuit of claim 36, wherein said at least one packetized data interface is at least one Ethernet interface.

67. The integrated circuit of claim 1, wherein at least one of said plurality of local bus interfaces comprises an interface to a bus for coupling to a random access memory.

68. The transaction switch of claim 20, wherein at least one of said plurality of addressed data devices comprises an interface to a bus for coupling to a random access memory.

69. The transaction switch of claim 30, wherein at least one of said plurality of disparate data transfer protocols comprises a protocol for transferring data on a bus with a random access memory.

70. The integrated circuit of claim 35, wherein at least one of said at least three data interfaces comprises an interface to a bus for coupling to a random access memory.

71. A network interface adapter, comprising:
- a local bus interface, configured to connect the adapter to a local bus and to perform an addressed data protocol on the local bus;
- a media access controller (MAC), configured to connect the adapter to a network and to perform a packetized data protocol on the network;
- a transport protocol engine, configured to perform protocol translation from the addressed data protocol to the packetized data protocol by creating a packet from data received on the local bus by the local bus interface;
- a memory, directly accessible by each of the local bus interface, the MAC, and the transport protocol engine in a random access fashion;
- a transaction switch, coupled to the local bus interface, the MAC, the transport protocol engine, and the memory, and configured to dynamically allocate a portion of the memory for buffering the data and the packet;
- wherein the transport protocol engine is configured to perform the protocol translation before the MAC reads the packet from the memory for transmission on the network, wherein the transport protocol engine performs the protocol translation without copying the data to another memory;
- wherein the transport protocol engine is further configured to perform second protocol translation from the packetized data protocol to the addressed data protocol by identifying a data payload within a second packet received from the network by the MAC and specifying a local bus address for the data payload;
- wherein the transport protocol engine is further configured to perform the second protocol translation before the local bus interface reads the data payload from the memory for writinci on the local bus to the local bus address, wherein the transport protocol engine performs the second protocol translation within the memory without copying the data to another memory.

72. The network interface adapter of claim 71, wherein a single integrated circuit comprises the local bus interface, the MAC, the transport protocol engine, the memory, and the transaction switch.

73. The network interface adapter of claim 71, wherein the transport protocol engine is configured to create the packet by writing a packet header into the memory in front of the data.

74. A network interface adapter, comprising:
a local bus interface, configured to connect the adapter to a local bus and to perform an addressed data protocol on the local bus;
a media access controller (MAC), configured to connect the adapter to a network and to perform a packetized data protocol on the network;
a transport protocol engine, configured to perform protocol translation from the packetized data protocol to the addressed data protocol by identifying a data payload within a packet received from the network by the MAC and specifying a local bus address for said data payload;
a memory, directly accessible by each of the local bus interface, the MAC, and the transport protocol engine in a random access fashion;
a transaction switch, coupled to the local bus interface, the MAC, the transport protocol engine, and the memory, and configured to dynamically allocate a portion of the memory for buffering the data payload and the packet;
wherein the transport protocol engine is configured to perform the protocol translation before the local bus interface reads the data payload from the memory for writing on the local bus to said local bus address, wherein the transport protocol engine performs the protocol translation without copying the data to another memory;
wherein the transport protocol engine is further configured to perform second protocol translation from the addressed data protocol to the packetized data protocol by creating a second packet from data received on the local bus by the local bus interface;
wherein the transport protocol engine is further configured to perform the second protocol translation before the MAC reads the second packet from the memory for transmission on the network, wherein the transport protocol engine performs the second protocol translation without copying the data to another memory.

75. The network interface adapter of claim 74, wherein a single integrated circuit comprises the local bus interface, the MAC, the transport protocol engine, the memory, and the transaction switch.

76. The network interface adapter of claim 74, wherein the transport protocol engine is configured to identify the data payload within the packet by specifying to the transaction switch an address of a location within the memory of the data payload.

77. A method for performing a transport layer function without double-buffering in a network interface adapter comprising a local bus interface, a media access controller (MAC), a transport protocol engine, and a memory managed by the transaction switch and directly accessible by each of the local bus interface, the MAC, and the transport protocol engine in a random access fashion, the method comprising:
allocating, by the transaction switch, a portion of the memory for buffering data received on the local bus by the local bus interface;
writing, by the local bus interface, the data into the allocated portion of the memory;
creating, by the transport protocol engine, with the data a packet within the allocated portion of the memory;
reading, by the MAC, the packet from the allocated portion of the memory for transmission on a network, after said creating, wherein the transport protocol engine performs said creating the packet without copying the data to another memory;
allocating, by the transaction switch, a second portion of the memory for buffering a second packet received from the network by the MAC;
writing, by the MAC, the second packet into the second allocated portion of the memory;
identifying, by the transport protocol engine, a data payload within the second packet;
specifying, by the transport protocol engine, a local bus address for the data payload; and
reading, by the local bus interface, the data payload from the second allocated portion of the memory for writing on the local bus to the local bus address, after said identifying and said specifying, wherein the transport protocol engine performs said identifying and said specifying without copying the data to another memory.

78. The method of claim 77, wherein said creating the packet comprises:
writing, by the transport protocol engine, a packet header into the allocated portion of the memory in front of the data.

79. A method for performing a transport layer function without double-buffering in a network interface adapter comprising a local bus interface, a media access controller (MAC), a transport protocol engine, and a memory managed by a transaction switch and directly accessible by each of the local bus interface, the MAC, and the transport protocol engine in a random access fashion, the method comprising:
allocating, by the transaction switch, a portion of the memory for buffering a packet received from the network by the MAC;
writing, by the MAC, the packet into the allocated portion of the memory;
identifying, by the transport protocol engine, a data payload within the packet;
specifying, by the transport protocol engine, a local bus address for the data payload;
reading, by the local bus interface, the data payload from the allocated portion of the memory for writing on the local bus to the local bus address, after said identifying and said specifying, wherein the transport protocol engine performs said identifying and said specifying without copying the data to another memory;
allocating, by the transaction switch, a second portion of the memory for buffering data received on the local bus by the local bus interface;
writing, by the local bus interface, the data into the second allocated portion of the memory;
creating, by the transport protocol engine, with the data a second packet within the second allocated portion of the memory; and
reading, by the MAC, the second packet from the second allocated portion of the memory for transmission on a network, after said creating, wherein the transport protocol engine performs said creating the second packet without copying the data to another memory.

80. The method of claim 79, wherein said identifying comprises:
specifying, by the transport protocol engine, to the transaction switch an address of a location within the memory of the data payload.

* * * * *

UNITED STATES PATENT AND TRADEMARK OFFICE
CERTIFICATE OF CORRECTION

PATENT NO. : 7,401,126 B2  Page 1 of 1
APPLICATION NO. : 09/817008
DATED : July 15, 2008
INVENTOR(S) : Richard E. Pekkala and Christopher J. Pettey It is certified that error appears in the above-identified patent and that said Letters Patent is hereby corrected as shown below:

Title page, item [54] and Col. 1, Delete the TITLE and change it to:

NETWORK INTERFACE ADAPTER AND TRANSACTION SWITCH

Signed and Sealed this

Twenty-sixth Day of August, 2008

JON W. DUDAS
*Director of the United States Patent and Trademark Office*